(12) United States Patent
Ooi et al.

(10) Patent No.: US 11,036,660 B2
(45) Date of Patent: Jun. 15, 2021

(54) NETWORK-ON-CHIP FOR INTER-DIE AND INTRA-DIE COMMUNICATION IN MODULARIZED INTEGRATED CIRCUIT DEVICES

(71) Applicant: Intel Corporation, Santa Clara, CA (US)

(72) Inventors: George Chong Hean Ooi, Bayan Lepas (MY); Lai Guan Tang, Tanjung Bungah (MY); Chee Hak Teh, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 71 days.

(21) Appl. No.: 16/368,688

(22) Filed: Mar. 28, 2019

(65) Prior Publication Data
US 2019/0227963 A1 Jul. 25, 2019

(51) Int. Cl.
*G06F 13/20* (2006.01)
*H01L 25/18* (2006.01)
(Continued)

(52) U.S. Cl.
CPC .............. *G06F 13/20* (2013.01); *G06F 30/34* (2020.01); *H01L 23/538* (2013.01); *H01L 24/16* (2013.01); *H01L 25/18* (2013.01); *H04L 49/90* (2013.01); *G06F 2115/08* (2020.01); *H01L 2224/16225* (2013.01); *H01L 2924/1431* (2013.01);
(Continued)

(58) Field of Classification Search
CPC ...... G06F 13/20; G06F 30/34; G06F 2115/08; H01L 25/18; H01L 23/538; H01L 24/16; H01L 2924/1437; H01L 2924/1431; H01L 2224/16225; H01L 2924/1436; H01L 23/5383; H01L 2224/16227; H01L 2924/15311; H01L 2924/15192; H04L 49/90

See application file for complete search history.

(56) References Cited

U.S. PATENT DOCUMENTS 9,106,229 B1 * 8/2015 Hutton .................. H01L 25/105
10,673,439 B1 * 6/2020 Ahmad ............ H03K 19/17748
(Continued)

OTHER PUBLICATIONS

"NoC Architectures for Silicon Interposer Systems: Why Pay for more Wires when you Can Get them (from your interposer) for Free", 2014 47th Annual IEEE/ACM International Symposium on Microarchitecture (Year: 2014).*
(Continued)

*Primary Examiner* — Farley Abad
(74) *Attorney, Agent, or Firm* — Fletcher Yoder, P.C.

(57) ABSTRACT

Systems or methods of the present disclosure may provide high-bandwidth, low-latency connectivity for inter-die and/or intra-die communication of a modularized integrated circuit system. Such an integrated circuit system may include a first die of fabric circuitry sector(s), a second die of modular periphery intellectual property (IP), a passive silicon interposer coupling the first die to the second die, and a modular interface that includes a network-on-chip (NOC). The modular interface may provide high-bandwidth, low-latency communication between the first die and the second, between the fabric circuitry sector(s), and between the first die and a third die.

20 Claims, 12 Drawing Sheets

(51) Int. Cl.
*H01L 23/538* (2006.01)
*H01L 23/00* (2006.01)
*H04L 12/861* (2013.01)
*G06F 30/34* (2020.01)
*G06F 115/08* (2020.01)

(52) U.S. Cl.
CPC ............... *H01L 2924/1436* (2013.01); *H01L 2924/1437* (2013.01)

(56) References Cited

U.S. PATENT DOCUMENTS

| | | | | |
|---|---|---|---|---|
| 2012/0124257 A1* | 5/2012 | Wu | ............... | H04L 49/405 710/106 |
| 2013/0064143 A1* | 3/2013 | Ryan | ............... | G06F 1/30 370/271 |
| 2013/0214432 A1* | 8/2013 | Wu | ............... | H01L 23/147 257/782 |
| 2014/0177626 A1* | 6/2014 | Thottethodi | ...... | H01L 23/49838 370/351 |
| 2015/0109024 A1* | 4/2015 | Abdelfattah | ............ | G06F 30/34 326/41 |
| 2017/0118111 A1* | 4/2017 | Bandic | .................... | H04L 49/00 |
| 2017/0170153 A1* | 6/2017 | Khare | ................. | H01L 23/5386 |
| 2018/0181524 A1 | 6/2018 | Schulz et al. | | |
| 2018/0358313 A1* | 12/2018 | Newman | ................. | G06F 13/20 |
| 2019/0044515 A1 | 2/2019 | Gutala et al. | | |
| 2019/0050361 A1 | 2/2019 | Raghava et al. | | |
| 2019/0363717 A1* | 11/2019 | Swarbrick | ............... | G06F 21/76 |

OTHER PUBLICATIONS

Extended European Search Report for EP 20155799.8 dated Sep. 2, 2020.
Xu et. al. "Double-Data-Rate, Wave-Pipelined Interconnect for Asynchronous NoCs," in IEEE Micro, vol. 29, No. 3, pp. 20-30, May-Jun. 2009, doi: 10.1109/MM.2009.40.
Kwon et al. "In-network reorder buffer to improve overall NoC performance while resolving the in-order requirement problem," 2009 Design, Automation & Test in Europe Conference & Exhibition, Nice, 2009, pp. 1058-1063, doi: 10.1109/Date.2009.5090821.

* cited by examiner

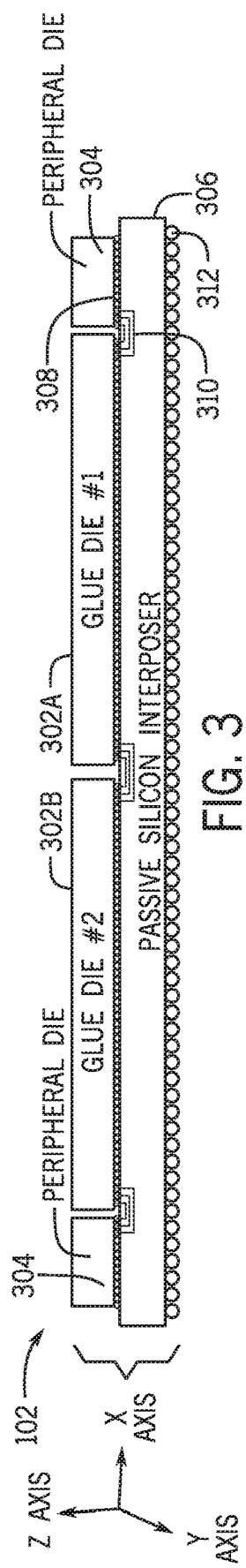
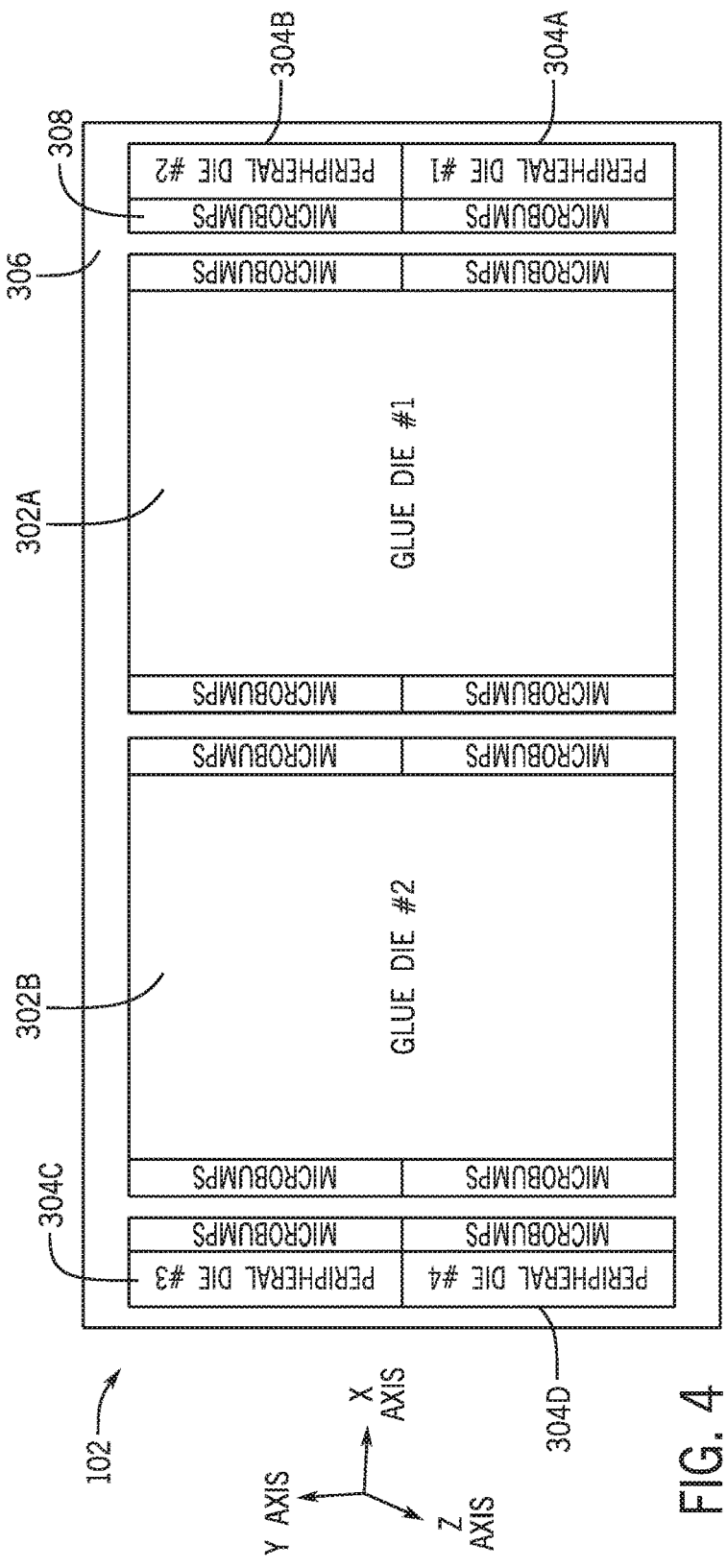

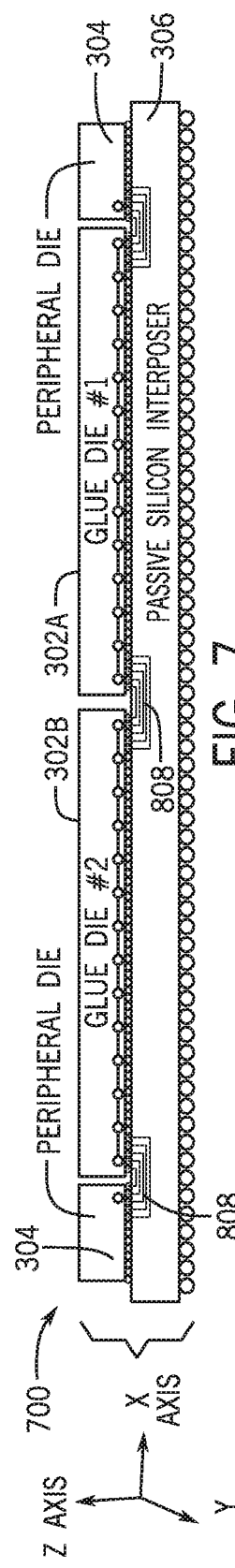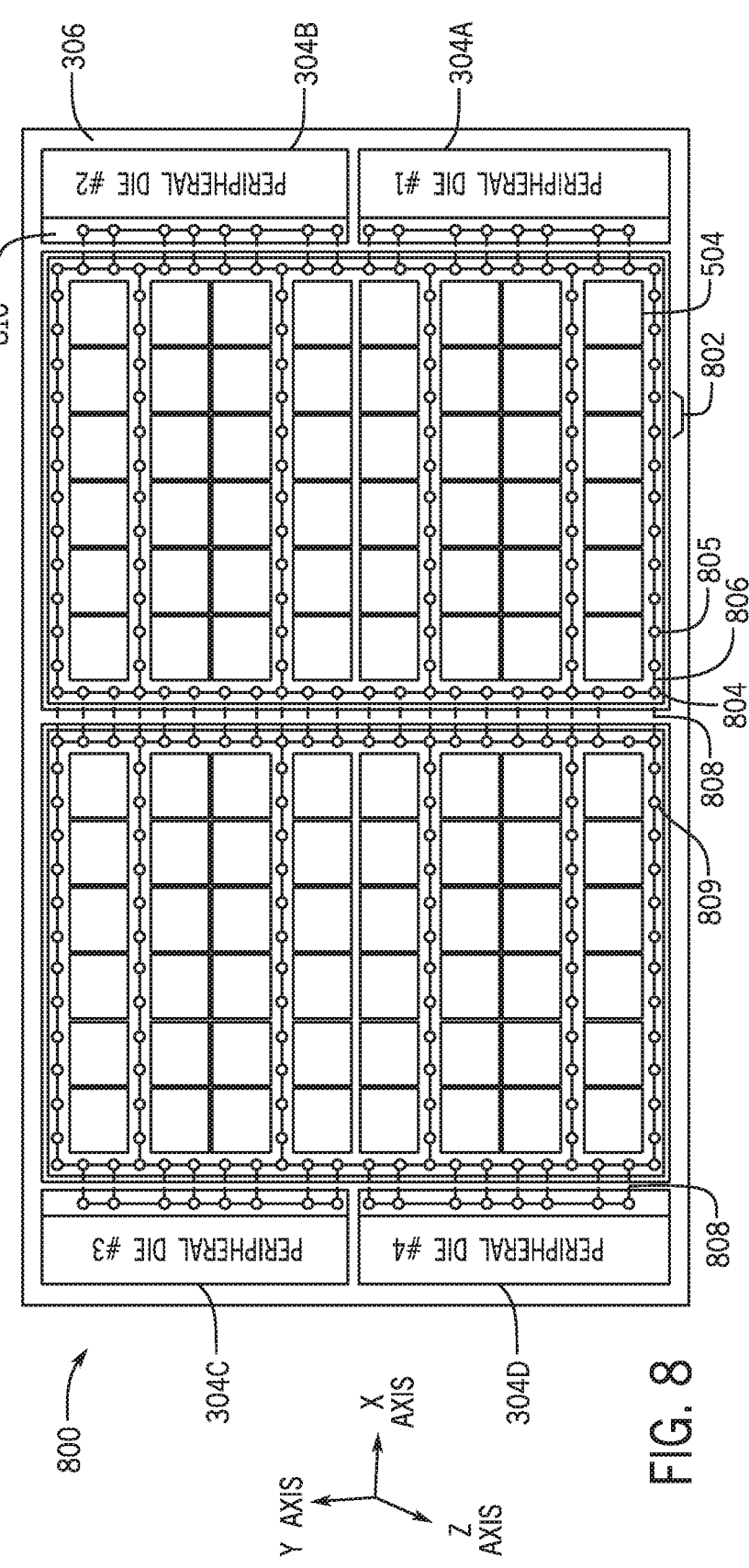

NETWORK-ON-CHIP FOR INTER-DIE AND INTRA-DIE COMMUNICATION IN MODULARIZED INTEGRATED CIRCUIT DEVICES

BACKGROUND

The present disclosure relates generally to integrated circuits, such as processors and/or field-programmable gate arrays (FPGAs). More particularly, the present disclosure relates to providing high-bandwidth, low-latency connectivity within a die and/or between dies of a modularized integrated circuit.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Modern electronics, such as computers, portable devices, network routers, data centers, Internet-connected appliances, and more, tend to include at least one integrated circuit device. Integrated circuit devices may take on a variety of forms, including processors (e.g., central processing units (CPUs)), memory devices, and programmable devices (e.g., FPGA), to name only a few examples. The programmable devices, in particular, may include a programmable fabric of logic that may be programmed (e.g., configured) and reprogrammed (e.g., reconfigured) after manufacturing to provide a wide variety of functionality based on a circuit design.

To facilitate different functionalities, the programmable device may include a variety of peripheral intellectual property cores (IPs) near and around the programmable fabric. For example, a universal interface bus (UIB) IP may be placed on a shoreline of the programmable fabric to avoid consuming excess routing circuitry of the programmable fabric. However, the restricted amount of shoreline and the manner in which the peripheral IP are integrated with the programmable fabric may result in design compromises that reduce functional and operational efficiency of the programmable device.

BRIEF DESCRIPTION OF THE DRAWINGS

Various aspects of this disclosure may be better understood upon reading the following detailed description and upon reference to the drawings in which:

FIG. 3 is a side view of a modularized integrated circuit device including peripheral intellectual property cores (IPs) that has been modularized into peripheral IP dies and programmable fabric modularized into glue dies, in accordance with an embodiment of the present disclosure;

FIG. 4 is a top view of the modularized integrated circuit device of FIG. 3 including the peripheral IP dies and the glue dies, in accordance with an embodiment of the present disclosure;

FIG. 7 is a side view of the modularized integrated circuit device of FIG. 4 including a network-on-chip (NOC) interface for inter-die and intra-die communication, in accordance with an embodiment of the present disclosure;

FIG. 8 is a top view of the modularized integrated circuit device of FIG. 4 including the NOC interface for inter-die and intra-die communication, in accordance with an embodiment of the present disclosure;

DETAILED DESCRIPTION OF SPECIFIC EMBODIMENTS

Figure 1:
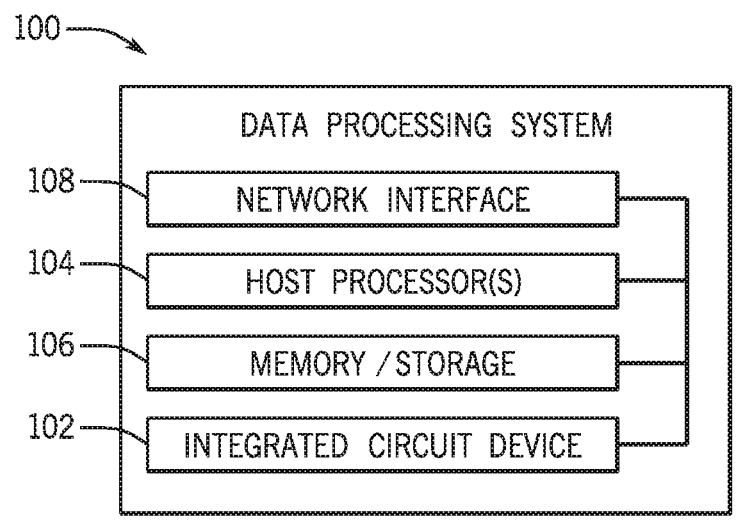
FIG. 1 is a block diagram of a data processing system including an integrated circuit device, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Integrated circuits, such as field-programmable gate arrays (FPGAs), may include a programmable fabric (e.g., logic array blocks (LABs), having logic elements such as digital signal processing (DSP) blocks, routing multiplexers, and so on) that may be configured and, in some cases, later reconfigured to realize a circuit design. To facilitate implementation of different design functionalities, the integrated circuit may also include one or more peripheral intellectual property cores (IPs) located near the programmable fabric, thereby forming a FPGA system-on-chip (SoC). For example, for FPGAs, higher bandwidth peripheral IP (e.g., double data rate (DDR), low power DDR (LPDDR), high bandwidth memory (HBM), embedded static random-access memory (eSRAM), universal interface bus (UM), input/output (I/O), and the like) may be placed around (e.g., top, bottom) the programmable fabric (e.g., at a shoreline, border, or at peripheral of the programmable fabric) to improve resource (e.g., routing circuitry) allocation throughout the FPGA SoC.

In other words, the peripheral IP may be placed near the edge of the programmable fabric where horizontal input/outputs (HIOs) and/or vertical input/outputs (VIOs) connections are located, so that data does not have to travel far and suffer from the resulting latency. Such integration of the peripheral IPs and the programmable fabric may occur in monolithic (e.g., fabrication of multiple components on a single silicon chip) FPGA SoC designs. That is, in monolithic FPGA SoCs, the peripheral IPs may be included as part of the FPGA main die. Although the present disclosure will primarily use the example of a programmable device (e.g., FGPA), systems and techniques of this disclosure may be applied to any suitable integrated circuit device, such as a processor (e.g., central processing unit (CPU)), memory, and the like.

Such monolithic FPGA SoCs however, may include a limited amount of shoreline around the programmable fabric, forcing compromises with regard to incorporation of the peripheral IPs (e.g., type, number) in the design. As an example, a single floorplan (e.g., integrated circuit layout) may be used for multiple device variations that each have different specifications for the peripheral IP and the programmable fabric. Using a single floorplan may reduce design and fabrication costs. However, to improve applicability of the single floorplan to the multiple product variations, the floorplan may include a design that compromises on the number of UIBs, I/Os, eSRAMs, and other peripheral IP that may be included around the limited shoreline. Thus, the monolithic FPGA designs may result in reduced device performance for each device variation and reduced overall scalability for multiple device variations.

Moreover, fabrication of the monolithic FPGA SoCs may be cost-inefficient and inaccurate. As an example, poor silicon yield may reduce the number of properly performing silicon dies on a wafer. In some instances, 90% of the silicon dies fabricated on the wafer may be unusable due to process variations. Thus, since relatively large silicon dies may be used during fabrication of the monolithic FPGA SoCs to fit the programmable logic, the peripheral IPs, and other components on a die, 90% of the FPGA SoC devices fabricated may be unusable.

As another example, reticle size limit may restrict the size of the monolithic FPGA SoC die. In particular, in micro-lithography fabrication techniques, a photomask (e.g., reticle) may be used to project an integrated circuit pattern layer onto the wafer, and appropriate chemical steps may fabricate the pattern layer onto the wafer. However, the larger the photomask becomes, such as for fabricating the relatively large FPGA SoC dies, the more distortion and imperfections may be introduced in the photomask. As such, fabrication of the monolithic FPGA SoC die may result in reduced precision and reliability of the FPGA SoC.

To improve modularity and fabrication yield of the FPGA SoC, the FPGA SoC may be disaggregated into smaller dies. For example, the FPGA SoC may be disaggregated into peripheral IP dies, which each include architecture for a particular peripheral IP, and programmable fabric dies (e.g., glue dies) that include the programmable logic fabric. Once disaggregated and modularized, the peripheral IP dies may be independently designed and fabricated from the design and fabrication of the glue dies. Further, the interface between the dies of the disaggregated FPGA SoC may be standardized to enable the modularization of the dies. For example, with a standardized interface, any type of peripheral IP die may be incorporated into the FPGA SoC design. As such, the cost and time consumed during tape-in and tape-out for the design variations may be reduced.

The standardized interface, in particular, may include many die-to-die interconnects. Each interconnect may include a metal trace embedded in a passive silicon interposer (e.g., electrical interface routing) that is coupled to a microbump (e.g., bonding medium supporting power and signals between dies) of a die and to another microbump of another die. For example, the die-to-die interconnect may connect glue dies or the glue die to the peripheral IP die. In some embodiments, the silicon interposer may be an active silicon interposer.

Similar to data transfer requirements between components of the monolithic FPGA SoC, high-bandwidth and low-latency connectivity should be supported between dies of a modularized integrated circuit. For example, a glue die communicatively coupled to a universal interface bus (UM) IP die may support relatively high bandwidths to facilitate interfacing of the UIB IP die with high bandwidth memory (HBM). Since each microbump may be used to transmit a single signal, enabling high-bandwidth and low-latency connections between dies, such as between the UIB IP die and the glue die, may utilize a large number of die-to-die interconnections and microbumps. However, the number of microbumps available per die may be limited by the size of the die, height of each microbump, and/or pitch (e.g., diagonal distance) between microbumps. Thus, increasing the number of microbumps to meet bandwidth and latency connectivity demand may increase overall silicon die area to accommodate the extra microbumps and thus, may increase fabrication costs of the FPGA SoC.

Accordingly, and as further detailed below, embodiments of the present disclosure relate generally to enabling high-bandwidth, low-latency connectivity within a die and/or between dies of a modularized integrated circuit. In some embodiments, a network-on-chip (NOC) interface may be integrated with the silicon interposer to implement high-bandwidth and low-latency connectivity. In particular, the NOC interface may include one or more routers that may prioritize data and appropriately route the data downstream. Further, the routers may include multiple ports, a portion of which may facilitate communication with other routers of the NOC interface and another portion of which may facilitate communication to and from other dies via router bridges. The router bridge may provide data prioritization and clock domain crossing (CDC) functionality to enable synchronized data transfer between, for example, a clock domain of a glue die and a clock domain of the router. As such, the NOC interface architecture may enable user logic on the glue die to operate at its own frequency independent from the NOC operating frequency, resulting in scalable devices. In addition, because the NOC interface is modular due to the router units, the NOC interface may be scalable and may facilitate design reuse in modularized integrated systems.

Further, in some embodiments, a router may be communicatively coupled to another router by a transmitting (Tx)/receiving (Rx) interface spanning between microbumps of a first die and microbumps of a second die via the passive silicon interposer. The Tx/Rx interface, in particular, may include components that facilitate asynchronous data transfer between the routers of the NOC. For example, the Tx/Rx interface may include embedded clock crossers and double data rate (DDR) modules that compensate for and/or reduce data skew and provide accelerated data transfer. Additionally or alternatively, the Tx/Rx interface may include components that facilitate synchronous data transfer between the routers of the NOC. As an example, the Tx/Rx interface may include embedded clock crossers that implement DDR and time-division multiplexing (TDM) to provide accelerated data transfer. Regardless, the Tx/Rx interface may enable efficient (e.g., high-bandwidth, low latency) data transfer with less microbump overhead as compared to data transfer via die-to-die interconnections. Thus, the NOC interface may meet connectivity performance demands without consuming extra silicon area.

Additionally, in some embodiments, the NOC interface may be spread throughout the FPGA SoC to facilitate inter-die and intra-die communication. For example, the routers may be spread between programmable fabric sectors of the glue die, between glue dies, and/or between the glue dies and the peripheral IP dies. Such routing configuration of the NOC interface may provide further reach into the programmable fabric of the glue dies, resulting in reduced routing congestions and ability to spread application hot spots (e.g., power consuming sections of the integrated circuit) as compared to communication via edge HIOs/VIOs.

With the foregoing in mind, FIG. 1 is a block diagram of a data processing system 100 including an integrated circuit device 102, in accordance with an embodiment of the present disclosure. The data processing system 100 may include more or fewer components (e.g., electronic display, user interface structures, application specific integrated circuits (ASICs)) than shown. The data processing system 100 may include one or more host processors 104, such as an INTEL® Xeon® processor or a reduced-instruction processor (e.g., a reduced instruction set computer (RISC), an Advanced RISC Machine (ARM) processor) that may manage a data processing requests for the data processing system 100 (e.g., to perform machine learning, video processing, voice recognition, image recognition, data compression, database search ranking, bioinformatics, network security pattern identification, spatial navigation, or the like).

The host processor(s) 104 may communicate with the memory and/or storage circuitry 106, which may be a tangible, non-transitory, machine-readable-medium, such as random-access memory (RAM), read-only memory (ROM), one or more hard drives, flash memory, or any other suitable optical, magnetic or solid-state storage medium. The memory and/or storage circuitry 106 may hold data to be processed by the data processing system 100, such as processor-executable control software, configuration software, system parameters, configuration data, etc.

The data processing system 100 may also include a network interface 108 that allows the data processing system 100 to communicate with other electronic devices. In some embodiments, the data processing system 100 may be part of a data center that processes a variety of different requests. For instance, the data processing system 100 may receive a data processing request via the network interface 108 to perform machine learning, video processing, voice recognition, image recognition, data compression, database search ranking, bioinformatics, network security pattern identification, spatial navigation, or some other specialized task. The data processing system 100 may further include the integrated circuit device 102 that performs implementation of data processing requests.

Figure 2:
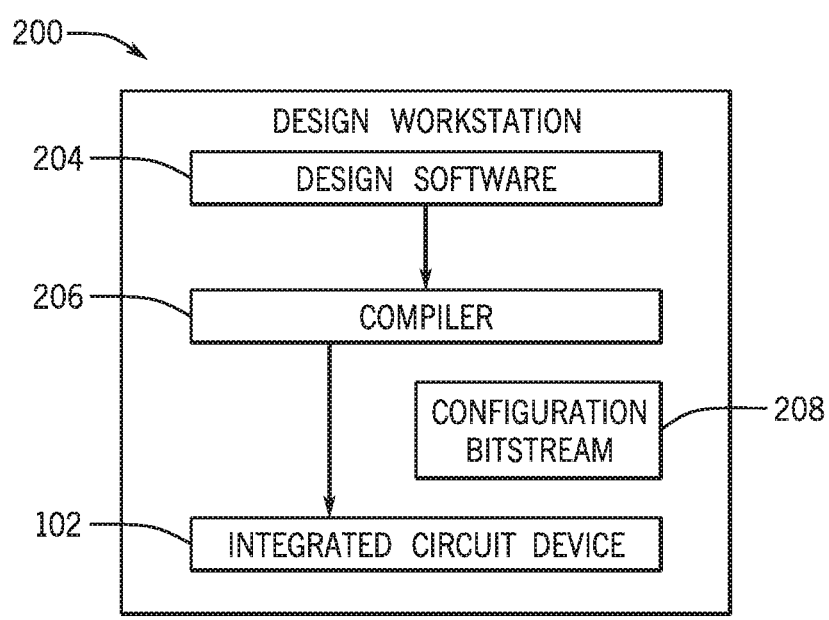
FIG. 2 is a block diagram of a design workstation that may facilitate programming of the integrated circuit device of FIG. 1, in accordance with an embodiment of the present disclosure.

A designer may use a design workstation 200 to develop a design that may configure the integrated circuit device 102, as shown in FIG. 2, in accordance with an embodiment of the present disclosure. In some embodiments, the designer may use design software 204 (e.g., Intel® Quartus® by INTEL CORPORATION) to generate a design that may be used to program (e.g., configure) the integrated circuit device 102. For example, a designer may program a modularized integrated circuit device 102 to implement a specific functionality, such as implementing a circuit design (e.g., higher-level circuit design), as if the integrated circuit device 102 were monolithic. The integrated circuit device 102 may be a programmable integrated circuit, such as a field-programmable gate array (FPGA) that includes the programmable fabric die(s) and periphery IP die(s), which together implement one or more circuit designs.

As such, the design software 204 may use a compiler 206 to generate a lower-level circuit-design configuration for the integrated circuit device 102. That is, the compiler 206 may provide machine-readable instructions representative of the designer-specified functionality to the integrated circuit device 102, for example, in the form of a configuration bitstream 208. The host processor(s) 104 may coordinate the loading of the bitstream 208 onto the integrated circuit device 102 and subsequent programming of the programmable fabric.

As described above, to improve scalability and fabrication yield of the integrated circuit (e.g., FPGA), the FPGA SoC may be disaggregated, such that the periphery IP may be modularized into peripheral IP dies and the programmable fabric may be modularized into glue dies. Modularization of the peripheral IP and the programmable fabric may enable design and fabrication of the peripheral IP die to occur independently of the design and fabrication of the glue die and in a manner that enables modular interfacing (e.g., as defined by a specification to achieve a substantially uniform manner of interfacing for different tiles, which may be standardized) between the peripheral IP die and the glue die. As such, FIG. 3 and FIG. 4 illustrate a side view and a top view, respectively, of an example integrated circuit device 102 constructed with modularized glue dies 302 and peripheral IP dies 304, in accordance with an embodiment of the present disclosure. Although the integrated circuit device 102 is shown as an FPGA, it should be appreciated that the periphery IPs may be modularized for any suitable type of integrated circuit device 102.

As shown, one or more glue dies 302A, 302B (collectively 302) may be included in the modularized integrated circuit device 102 to facilitate programming of the FPGA. In particular, the glue die 302 may include the programmable fabric, which may be divided into one or more sectors that each include programmable logic. The programmable logic may be arranged in groups that are sometimes referred to as configurable logic blocks (CLBs) or Logic Array Blocks (LABs). The programmable fabric may also include other logic, such as memory logic array blocks (MLABs), routing circuitry, and the like. The programmable logic may receive the configuration bitstream 208 from the host processor(s) 104 and may be configured in accordance with the circuit design embodied by the configuration bitstream 208. The glue dies 302 may be configured or partially configured at run-time and/or may be re-configured or partially re-configured at a later time, enabling design flexibility post-manufacturing.

Further, as shown, peripheral IP dies 304 may be placed near the glue dies 302. The peripheral IP dies 304 may include periphery IPs, such as I/O IP, UIB IP, memory IPs, SoC processors, and the like. Briefly, an I/O die and an UIB die may be used to facilitate communication between the glue dies 302 and external devices, such as external memory IP (e.g., in the form of dynamic random-access memory (DRAM)) and high bandwidth memory (HBM) IP, respectively. By modularizing periphery IP, it may be easier to customize product variations and to scale future product lines. Further, since the peripheral IP dies 304 may be designed and/or fabricated independently of the glue dies 302 due to not being on the same die as the glue dies 302, the periphery IPs may no longer limit buildable die size or FPGA design flexibility.

Data communication between the dies 302, 304 of the modularized integrated circuit device 102 may occur via embedded interface bridges, such as signal-conducting channels, disposed in a passive silicon interposer 306 (e.g., a 2.5D silicon interposer). Briefly, the passive silicon interposer 306 may be a small piece of silicon that includes routing layers used to connect the dies 302, 304 fabricated on the passive silicon interposer 306. In a 2.5D silicon interposer, for example, the dies 302, 304 may be stacked or placed side-by-side on top of the passive silicon interposer 306.

To further facilitate communication via the interface bridges 310 (e.g., metal traces) embedded within the passive silicon interposer 306, the modularized integrated circuit device 102 may include microbumps 308 on the edge and/or throughout the glue dies 302 and/or peripheral IP dies 304. A microbump 308 may be bonding medium that supports interfacing power and signals between dies 302, 304. For example, a terminal of an interface bridge 310 may be coupled to a microbump 308 of a first die (e.g., die 302) while another terminal of the interface bridge 310 may be coupled to a microbump 308 of a second die (e.g., die 304). As such, the microbumps 308 and the interface bridge 310 facilitate electrical connectivity to carry signals between the dies 302, 304.

The interface bridges 310, in particular, may be a NOC interface and/or a die-to-die interconnect interface. The interface bridges 310 within the passive silicon interposer 306 may enable standardized and modular communication between the dies 302, 304, thereby enabling relatively easy customization for different product variations and programming of the integrated circuit device 102 by the design workstation 200 as if the integrated circuit device 102 were monolithic.

Moreover, communication on the modularized integrated circuit device 102 may be facilitated via vertical electrical connections (e.g., through-silicon vias (TSVs)) that pass-through layers of the wafer or die 302, 304 and/or via controlled collapse chip connection (C4 bumps 312) that provide connection to external circuitry. In any case, the passive silicon interposer 306 provides interface connections and/or metal layers to build thousands of connections between and within the dies 302, 304. Although the modularized integrated circuit 102 is shown with a certain number and type of dies, interfaces, and other components, any amount and/or type of components may be included in the modularized integrated circuit 102 to facilitate its functionality.

Figure 5:
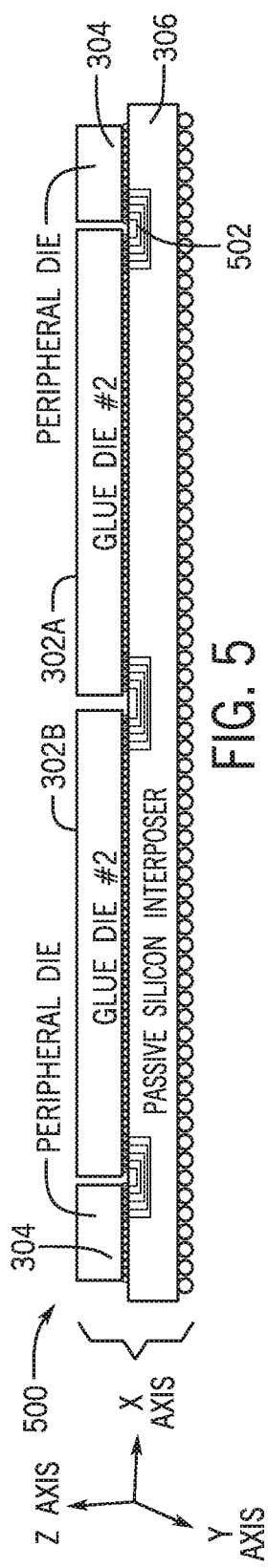
FIG. 5 is a side view of the modularized integrated circuit device of FIG. 4 including point-to-point interconnections for inter-die communication, in accordance with an embodiment of the present disclosure.
Figure 6:
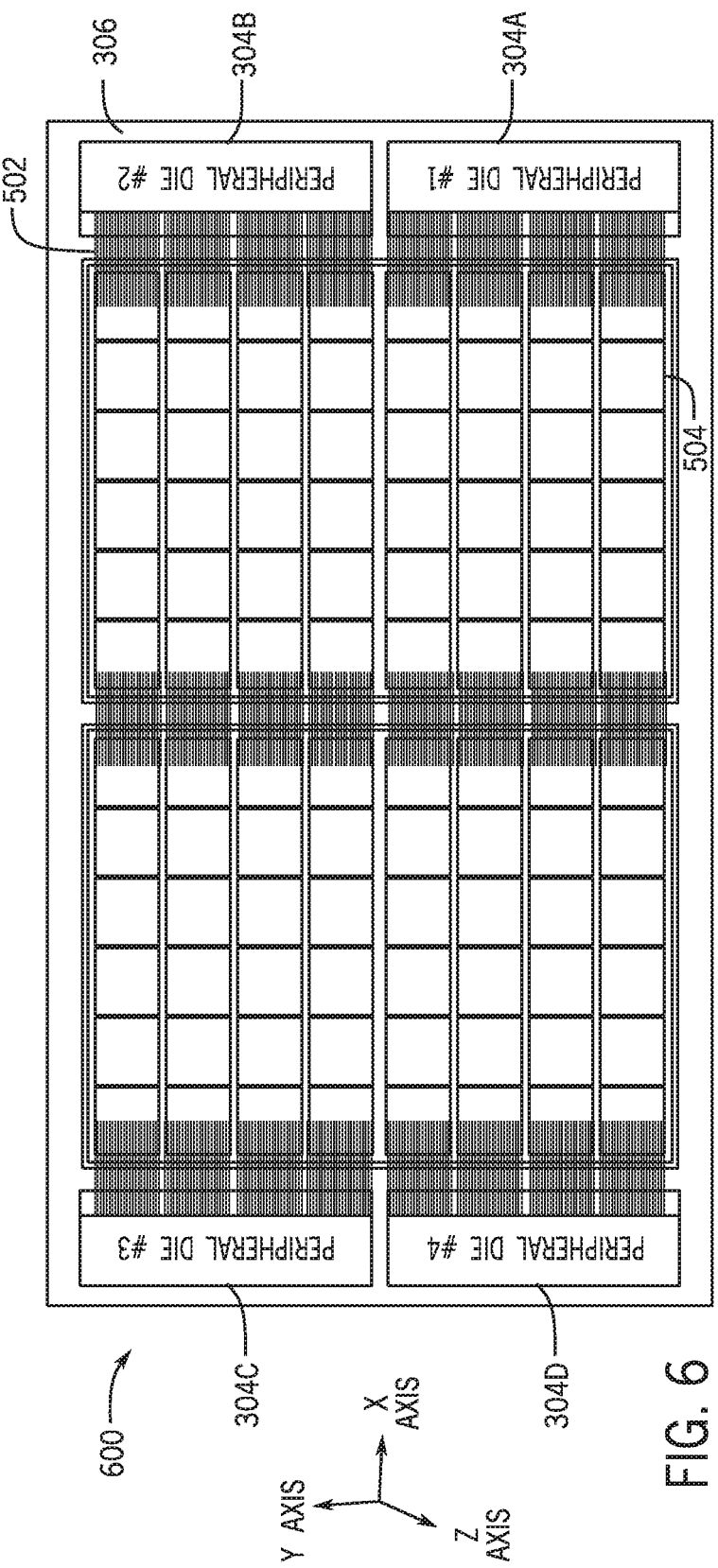
FIG. 6 is a top view of the modularized integrated circuit device of FIG. 4 including the point-to-point interconnections for inter-die communication, in accordance with an embodiment of the present disclosure.

The connections between the dies 302, 304 may include die-to-die interconnections that facilitate direct communication between the dies 302, 304. FIG. 5 and FIG. 6 illustrate a side view and a top view, respectively, of such die-to-die direct interconnections 502 that may be included in the modularized integrated circuit device 500, 600, in accordance with an embodiment of the present disclosure. For die-to-die direct communication, each microbump 308 may be associated with an interface bridge 310 embedded in the passive silicon interposer 306, and thus, each of the interface bridge 310 may communicatively couple two separate dies 302, 304. For example, the interface bridge 310 may be part of an Advanced Interface Bus-Direct intellectual property column (AIB-D IP column) used to directly connect a sector 504 of the glue die 302 to the peripheral IP dies 304 via the silicon interposer 306 without using a network-on-chip interface. Such die-to-die direct interconnections 502 may enable a user to harness functionality of the modularized integrated circuit device 500 as if the modularized integrated circuit device 500 were a larger monolithic FPGA SoC. In other word, the die-to-die direct interconnections 502 result in the modularized integrated circuit device 500 appearing as a monolithic FPGA SoC.

Similar to data transfer requirements between components of the monolithic FPGA SoC, high-bandwidth and low-latency connectivity should be supported between dies 302, 304 of a modularized integrated circuit 500. As an example, an acceleration function unit (AFU) programmed in the programmable fabric of the glue die 302 may operate more effectively with high-bandwidth and/or low-latency access to the HBM and other external dynamic-random access memory (DRAM) to meet system performance. As such, the AFU blocks may be programmed (e.g., placed) in sectors 504 adjacent to the peripheral IP dies 304 (e.g., UM IP dies or I/O IP dies) that interface with the HBM or other external DRAM. The AFU blocks may be placed in such sectors 504 to reduce or minimize the distance of the die-to-die direct interconnections 502 coupling the AFU blocks in such sectors to the peripheral IP dies 304. Thus, the placement of the AFU blocks adjacent to the peripheral IP dies 304 may result in less communication latency as compared to transferring data from AFU blocks programmed (e.g., placed) in sectors (e.g., 504) deeper within the glue die 302.

Although using the die-to-die direct interconnections 502 to communicatively connect the dies 302, 304 together may be a better performing option than using traditional FPGA interconnections (e.g., the HIOs, VIOs) in terms of bandwidth and power consumption, the die-to-die direct interconnections 502 may provide high-bandwidth and low-latency connectivity at the expense of silicon area. In particular, since each microbump 308 may be used to transmit a single signal, enabling high-bandwidth and low-latency connections between dies 302, 304 may use a large number of die-to-die interconnections and microbumps 308. However, the number of microbumps that may be accommodated by a die may be limited by the size of the die, height of each microbump, and/or pitch (e.g., diagonal distance) between microbumps 308. For example, a standard sector 504 may be 2700 microns by 2300 microns and based on the height and/or pitch between the microbumps 308, the sector 504 may accommodate up to 4500 microbumps. Thus, increasing the number of microbumps to meet bandwidth and latency connectivity demand may increase overall silicon die area to accommodate the extra microbumps and thus, may increase fabrication costs of the FPGA SoC.

To meet high-bandwidth and low-latency connectivity demands using a scalable, modular communication interface that does not consume unacceptable amounts of power and/or silicon area, a network-on-chip (NOC) topology network may be integrated with the passive silicon interposer 306, such that the NOC interface facilitates interfacing with dies 302, 304 running at different frequency, data widths, bandwidth requirements, and the like. FIG. 7 and FIG. 8 depict a high-level organization of the NOC interface 802 used to facilitate inter-die and intra-die communication in modularized integrated circuit devices 700, 800, in accordance with an embodiment of the present disclosure.

As will be discussed in more detail below, the NOC interface 802 may include routers 804, intra-die interfaces 806 within dies 302, and inter-die interfaces 808 between dies 302, 304. The routers 804 may perform data processing, data synchronizing, and data transfer to different parts of the modularized integrated circuit device 700, 800. The intra-die interface 806 may communicatively connect two routers 804, 805 within a single die, such as the glue die 302A. Additionally, the inter-die interface 808 may communicatively connect two routers 804, 809 each belonging to a different die, such as to a glue die 302 and to the peripheral IP die 304, via the passive silicon interposer 306. Because the NOC interface 802 may span both the passive silicon interposer 306 of the glue die 302 and of the peripheral IP die 304, the NOC interface 802 may provide high-bandwidth, low-latency communication to much of the modularized integrated circuit device 700, 800. A greater or fewer number of routers 804 may be included than shown and/or a greater or fewer number of routers 804 associated with each sector 504 may be included than shown.

Each peripheral IP die 304 may include a fabric network-on-chip (FNOC) interface 810 within the passive silicon interposer 306. The FNOC interface 810 may bridge the peripheral IP die 304 to the glue die 302 using the high-speed (e.g., 1-1.5 GHz or higher), high-bandwidth (e.g., high bandwidth of 0.25-0.5 terabytes or higher per second per direction per link) NOC interface 802. Advanced Interference Bus-Edge (AIB-E) (e.g., edge interface) may further facilitate using the NOC interface 802. For example, the AIB-E may bridge together the NOC interfaces of the glue dies 302, the NOC interface within a glue die (e.g., 302A), and/or the NOC interface of the glue die 302 to the FNOC interface 810 of the periphery IP die 304.

Figure 9:
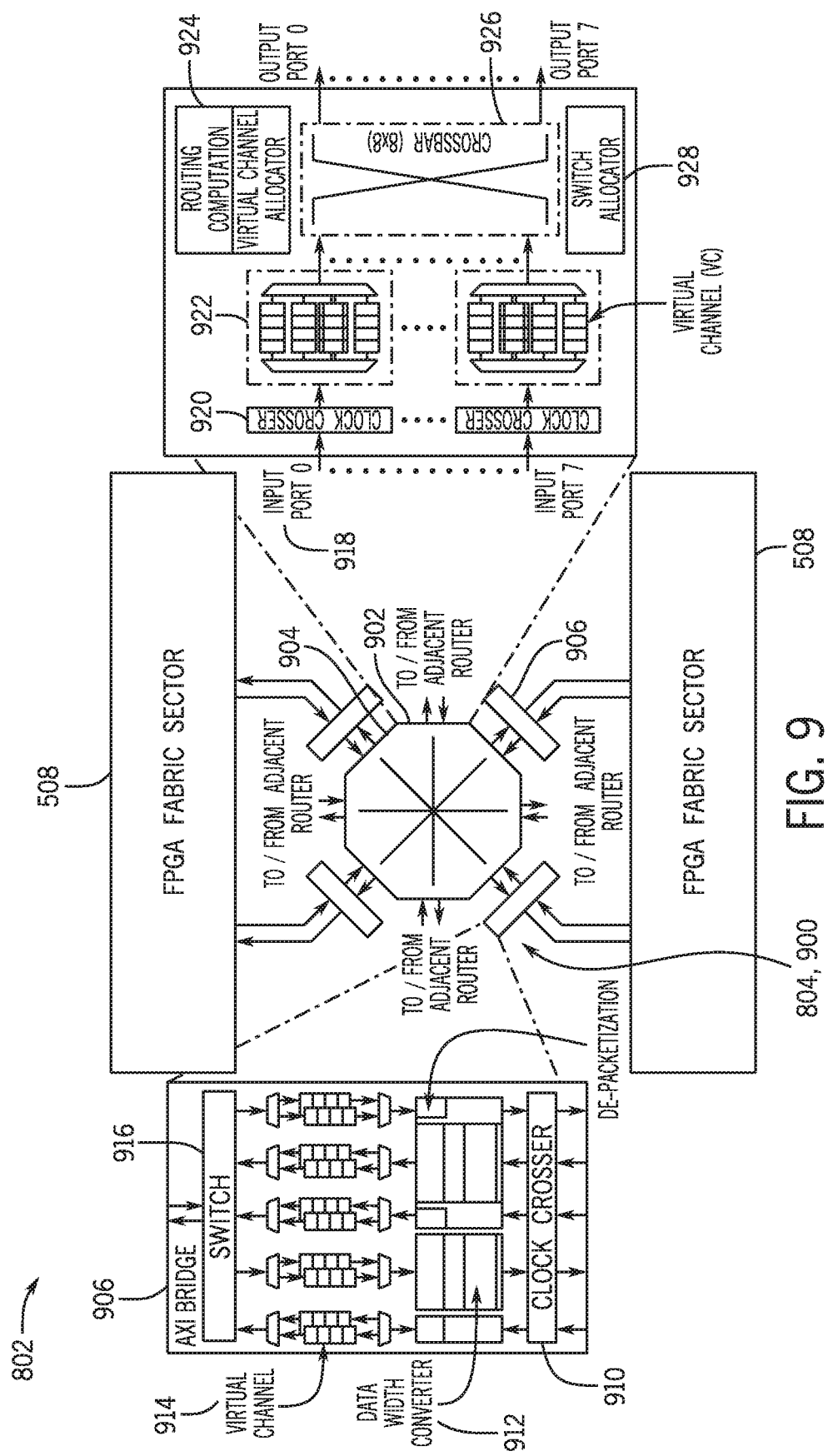
FIG. 9 is a schematic of NOC interface architecture that facilitates the inter-die and intra-die communication, in accordance with an embodiment of the present disclosure.

In particular, the router 804, 900 may perform data processing, data synchronizing, and data transfer to a destination within the modularized integrated circuit device 700, 800, as shown in FIG. 9 in accordance with an embodiment of the present disclosure. Although the router 900 shown depicts a glue die 302 to glue die 302 interface, it should be appreciated that the router 900 may act as an interface between a glue die 302 and a peripheral IP die 304. The router 900 may be an eight-port router, of which four ports 902 may be communicatively coupled to an adjacent router. For example, the ports 902 may be a part of the intra-die interface 806 used to facilitate intra-die communication between different portions of the glue die 302. The other four ports 904 may facilitate inter-die communication by communicatively coupling to a sector 508 of the glue die 302 and/or to the peripheral IP die 304, such as the UIB IP, via a router bridge 906. Despite the illustrated configuration, it should be noted that the router 900 may include any suitable number of ports 902, 904 and any suitable configuration of ports 902, 904.

The router bridge 906 may provide data prioritization and clock domain crossing (CDC) functionality, such as by converting from a glue die frequency to a router frequency. In particular, the router bridge 906 may include a clock crosser 910, data width converter channels 912, virtual channels 914, and a switch 916. To illustrate functionality, the clock crosser 910, for example, may first receive a packet of data from a sector 508 of the glue die 302. The packet of data may include a header denoting the beginning of the packet, data identification, and addressing information for the data source and data destination. Further, the packet of data may include a body, or the data itself, and also a tail that declares the end of the packet.

The clock crosser 910 may convert the data protocol from a user logic protocol (e.g., Advanced Interactive eXecutive 3 (AIX3), AIX4, Avalon Memory-Mapped (AVMM)) to a NOC operating protocol. That is, the clock crosser 910 may facilitate data protocol conversion. For example, the clock crosser 910 may modify the frequency of the data from a glue die frequency (e.g., 400-500 MHz) to a NOC operating frequency (e.g., 1 GHz-1.5 GHz). As another example, the clock crosser 910 may convert the organization of the data packets to match a NOC packet format dictated by the NOC operating protocol. As such, the bridge 906 may enable user logic on the glue die 302 to operate at its own accord (e.g., frequency) independent from the NOC operations.

Once the data protocol has been converted by the clock crosser 910, the data width may be converted by data width converter channels 912. The data width converter channels 912 may include address channels, data channels, write address channels, read address channels, and others that may convert data from a width used by the user logic of the glue die 302 to a width that is compatible with data widths used by in the NOC interface 802.

The data may then be transmitted to virtual channels 914 that aggregate data of similar priority to increase overall throughput during downstream transmission. In other words, data may be organized by priority in the virtual channels 914 and may be selected for downstream transmission based on their priority. The virtual channels 914 may be dedicated first in first out (FIFO) buffers. The switch 916 may switch between the virtual channels 914 based on the priority of the data held in each channel and may transmit the data to a router port, such as port 904, and subsequently to the router 900. It should be appreciated that the bridge 906 may also enable transmission of data in the opposite direction, that is, from the router 900 to the sector 508 or to the peripheral IP die 304. It should also be appreciated that a greater or fewer number of components may be included as part of the router 900 and bridge 906 than shown.

Once the router 900 receives the data, the router 900 may further process and transmit the data to its destination. As such, the router 900 may receive data from one of the input ports 918 at a router clock crosser 920 (e.g., from an adjacent router 900). The router clock crosser 920 may convert the data protocol from a NOC operating protocol to a user logic/periphery IP die protocol based on the destination of the data, as determined by, for example, the header of the packetized data. In other words, and as will be discussed below, the router 900 and the bridge 906 may support synchronous and asynchronous clock-crossing via embedded clock crossers within the router 900 and the bridge 906.

Once converted, the data may be transmitted to router virtual channels 922 that may further aggregate data of similar priority for joint downstream transmission. The data may then be transmitted to a crossbar 926 that may connect to appropriate output ports based on the destination of the data. In some embodiments, when two data aggregations are competing for output by the crossbar 926, a switch allocator 928 may arbitrate between the aggregations based on priority. Additionally, control logic 924 (e.g., routing computation, virtual channel allocator) may control operations of the router, for example, by reserving buffer space downstream before the data is transmitted and/or by finding the appropriate output port based on the destination of the data. The destination may include another router 900, a sector 508, or a periphery IP die 304.

In some embodiments, the routers 900 of the periphery IP dies 304 may be organized to form an efficient crossbar switch to enable memory sharing between different portions of user logic programmed on the glue die 302 without consuming programmable fabric resources (e.g., routing circuitry). Such functionality may be useful for periphery IP dies 304, such as UIB and I/O periphery IP, that interface with HBM and external DRAM, respectively.

Figure 10:
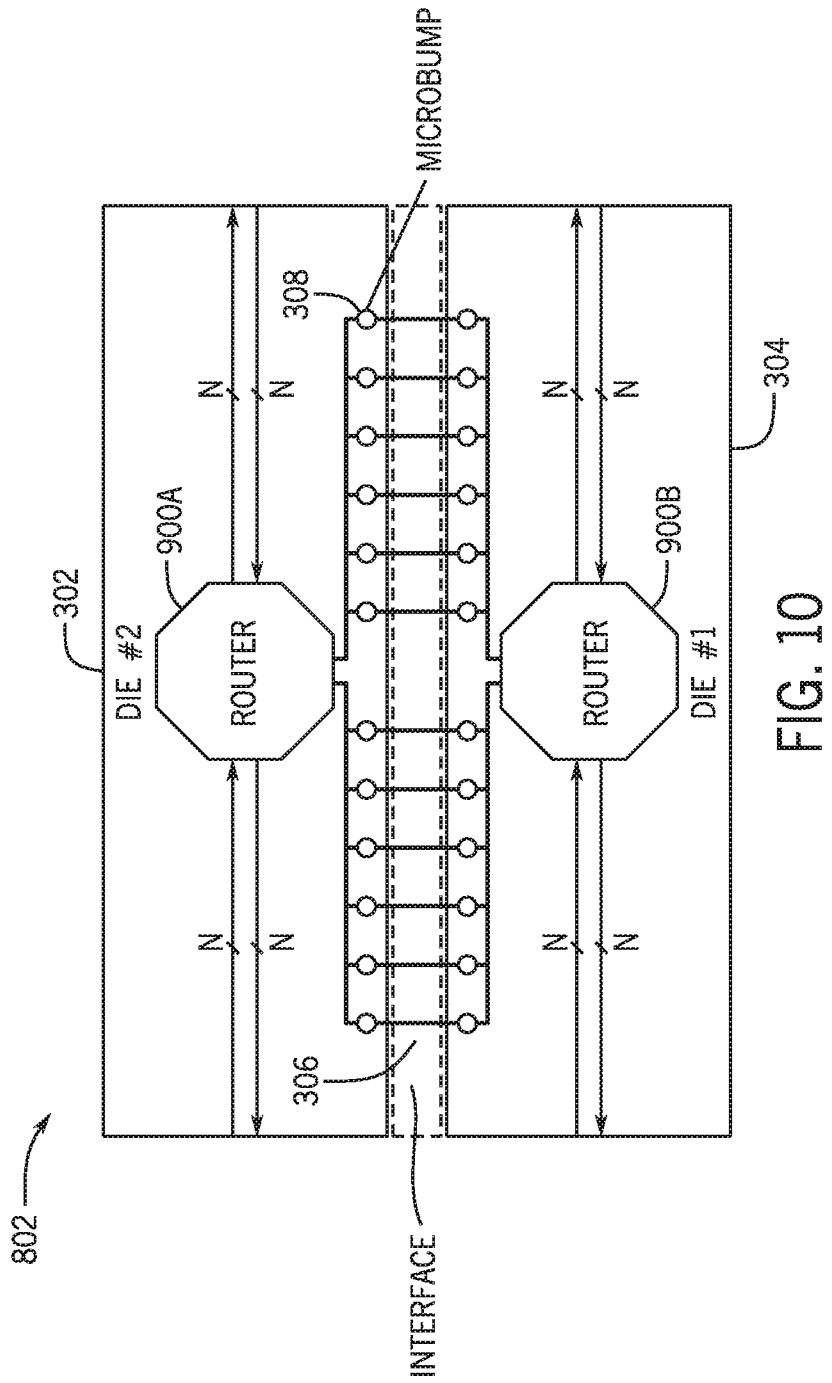
FIG. 10 is a schematic depicting a relation between microbumps of the modularized integrated circuit device of FIG. 8 and the NOC interface architecture of FIG. 9, in accordance with an embodiment of the present disclosure.

The integration of the NOC interface 802 with the passive silicon interposer 306 may occur via connections between microbumps 308, as depicted in FIG. 10, in accordance with an embodiment of the present disclosure. For example, a router (e.g., 900A) of a first die (e.g., a glue die 302 or a periphery IP die 304) may be coupled to a series of microbumps 308 at the edge of the first die 302, 304. Via the passive silicon interposer 306, the microbumps 308 at the edge of the first die 302, 304 may be communicatively coupled to the microbumps 308 at the edge of a second die (e.g., a glue die 302 or a periphery IP die 304) that includes a second router (e.g., 900B). It should be appreciated that a greater number of microbumps 308 may be used to interface routers 900A, 900B of the NOC interface 802 via the passive silicon interposer 306.

Figure 11:
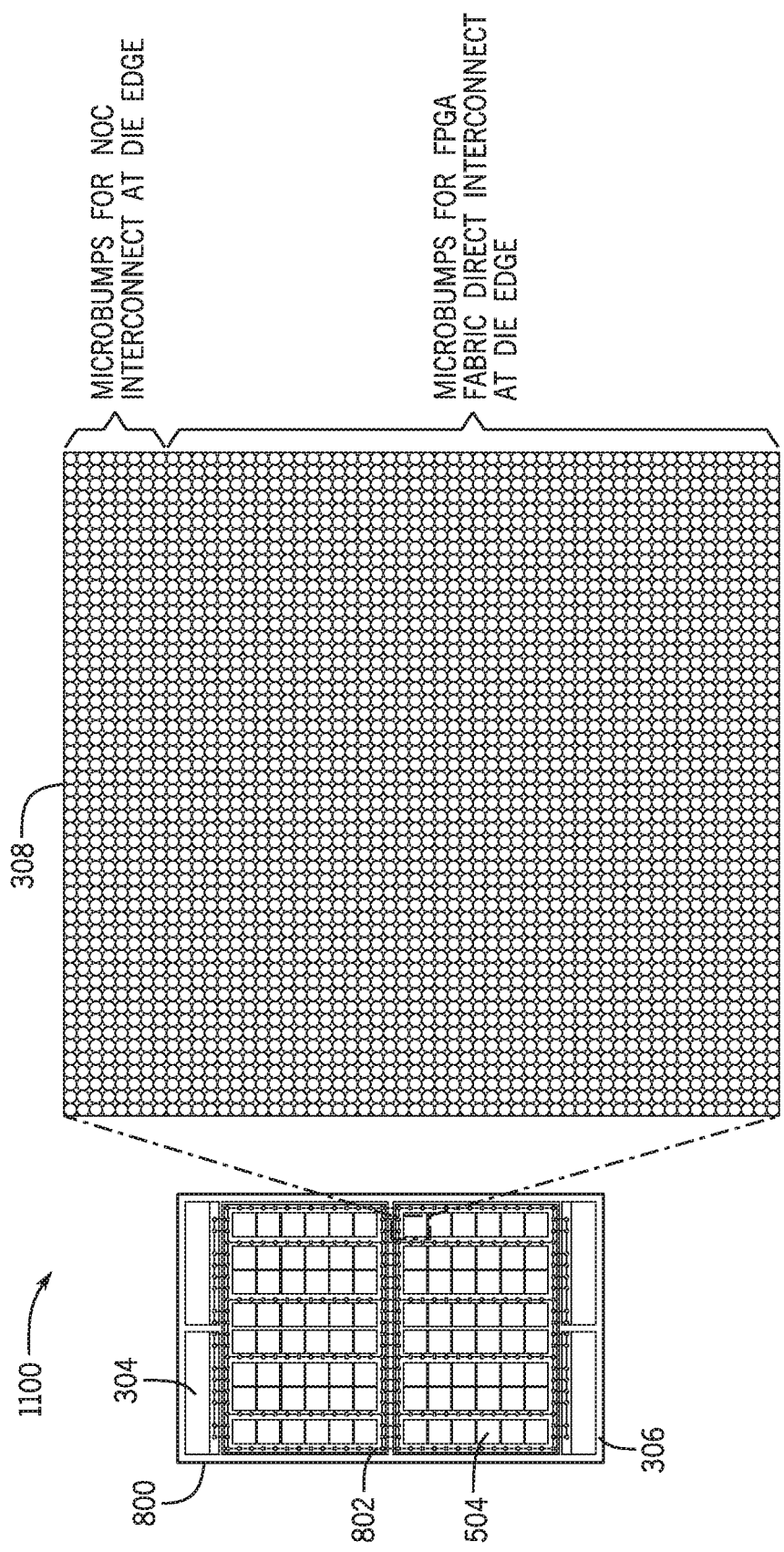
FIG. 11 is a schematic depicting allocation of the microbumps to the NOC interface of FIG. 9, in accordance with an embodiment of the present disclosure.

As previously mentioned, integration of the NOC interface 802 with the passive silicon interposer 306 may provide certain advantages, such as a decrease in the microbumps 308 consumed by the NOC interface 802, as illustrated by the microbump layout 1100 of the modularized integrated circuit devices 800 of FIG. 11, in accordance with an embodiment. For example, the NOC interface 802 may consume an eighth of the total microbumps 308 that would be used to provide the same amount of bandwidth and latency performance as a die-to-die direct interconnections 502.

Figure 12:
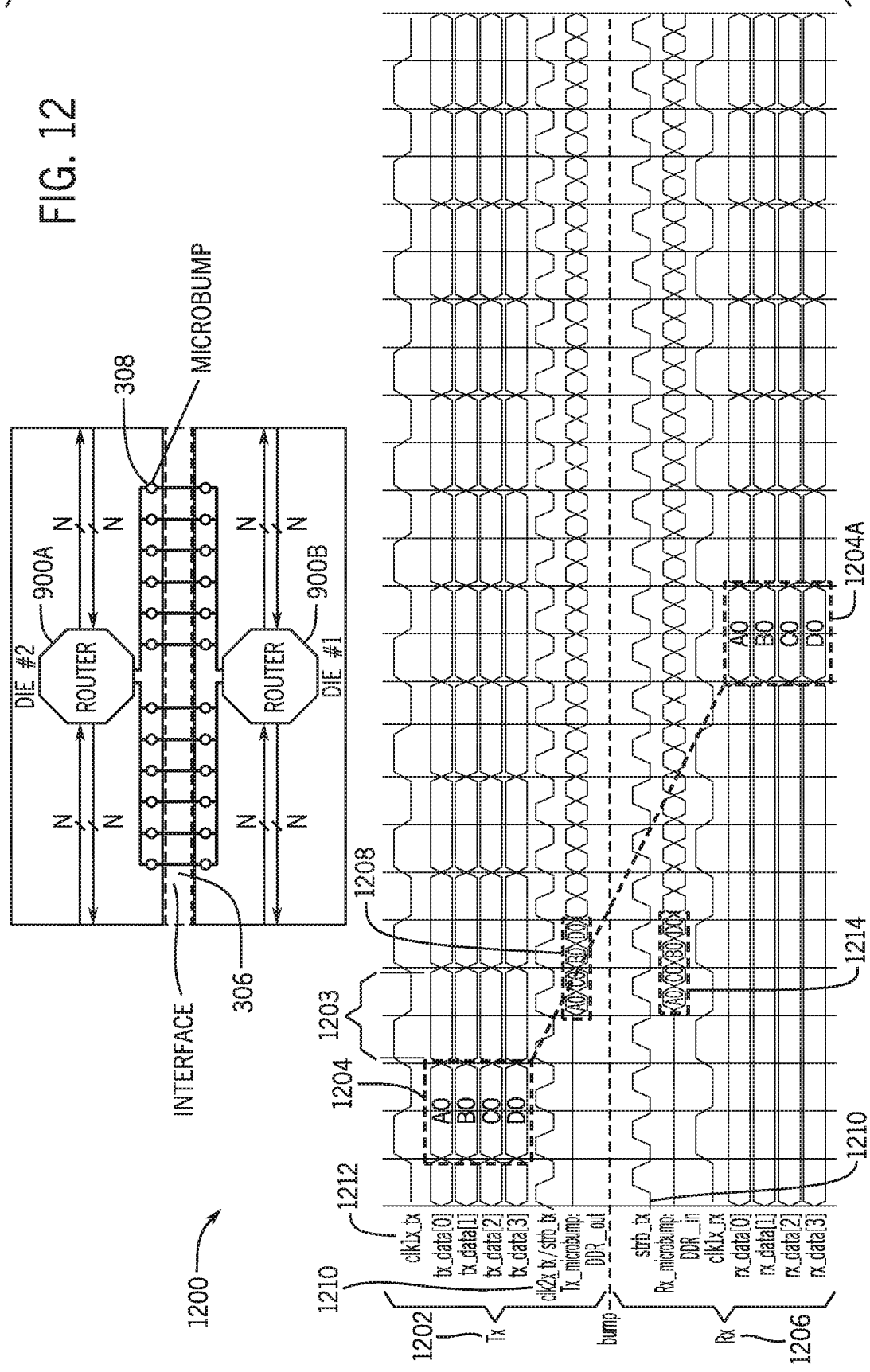
FIG. 12 is a timing diagram depicting data transfer between routers of the NOC interface of FIG. 9, in accordance with an embodiment of the present disclosure.

A timing diagram 1200 of FIG. 12 illustrates the manner in which data is transferred between routers 900 when the NOC interface 802 is used for inter-die and/or intra-die communication, in accordance with an embodiment of the present disclosure. As an illustrative example, a transmitting router (e.g., 900B, 1202) from the first die 302, 304 may transmit a packet of data 1204, such as 4 bits, to a receiving router (e.g., 900A, 1206) via a single microbump 308, as shown in, for example, FIG. 10. Since a single microbump 308 may generally only transmit a single signal, to transmit 4 bits of data while meeting bandwidth and latency specifications, the data transfer may be sped up using DDR (double data rate), TDM (time-division multiplexing), and/or higher clocking frequencies.

As shown, the packet of parallel data 1204 may be serialized into single-bit-wide data 1208 using, for example, TDM techniques. Further, DDR may be used in conjunction with a higher frequency clock to transfer the 4 bits of data 1204 in the time traditionally used to transmit a single bit of data via a single microbump. In other words, DDR and the higher frequency clock may be used to transmit the multi-bit data 1204 as if the data 1204 were a single bit of data 1208.

In this example, the router 900 may operate in a router clock domain (clk1x_tx 1212) and may transfer data to a NOC Tx/Rx interface (e.g., transmitting module) that operates in an interface clock domain (e.g., clk2x_tx/strb_tx) 1210. The interface clock domain 1210 may be twice as fast as the router clock domain 1212. The increased speed of the interface clock domain 1210 may facilitate transmission of the multi-bit data 1204 as if the data 1204 were a single bit 1208. In particular, using DDR, one bit of the data 1204 may be transmitted during a rising edge of the higher frequency clock 1210 and another bit of the data 1204 may be transmitted during a falling edge of the higher frequency interface clock domain 1210. Thus, in the period 1203 used to traditionally transmit a single bit of data (e.g., A0), 4 bits of data (e.g., A0, B0, C0, D0) may be transmitted. As such, the NOC interface 802 may facilitate high-bandwidth data transfer between portions of the modularized integrated circuit device 800 using, for example, a fourth of the microbumps 308 normally used to transfer the same amount of data.

In some embodiments, the high-bandwidth data transfer illustrated by the timing diagram 1200 may be achieved using TDM and a higher clock frequency. For example, by running the interface clock domain 1210 at four times as fast as the router clock domain 1212 and by serializing the data using TDM, 4 bits of data 1208 may be transmitted in the transmission period 1203 taken to transmit a single bit without using TDM and the higher frequency interface clock domain 1210. However, such a fast clock 1210 may not be implementable due to power and other performance constraints and thus, DDR may be used to meet connectivity performance demands.

Additionally, the receiving router (e.g., 900B, 1206) may reproduce the data 1208 in its original format once the data 1208 is received by the receiving router 900B, 1206. The receiving router 900B, 1206 may receive the serialized data 1208 using techniques in a reverse order than that used to transmit the data 1208. For example, the receiving router 900B, 1206 may receive the data 1214 using DDR and a high frequency interface clock (strb_tx 1210). Once received, the data 1214 may be deserialized using a demultiplexing technique to regenerate the original 4-bit data 1204A. Demultiplexing may include sampling the data 1214 at the rising edge and the falling edge of the interface clock domain 1210.

Figure 13:
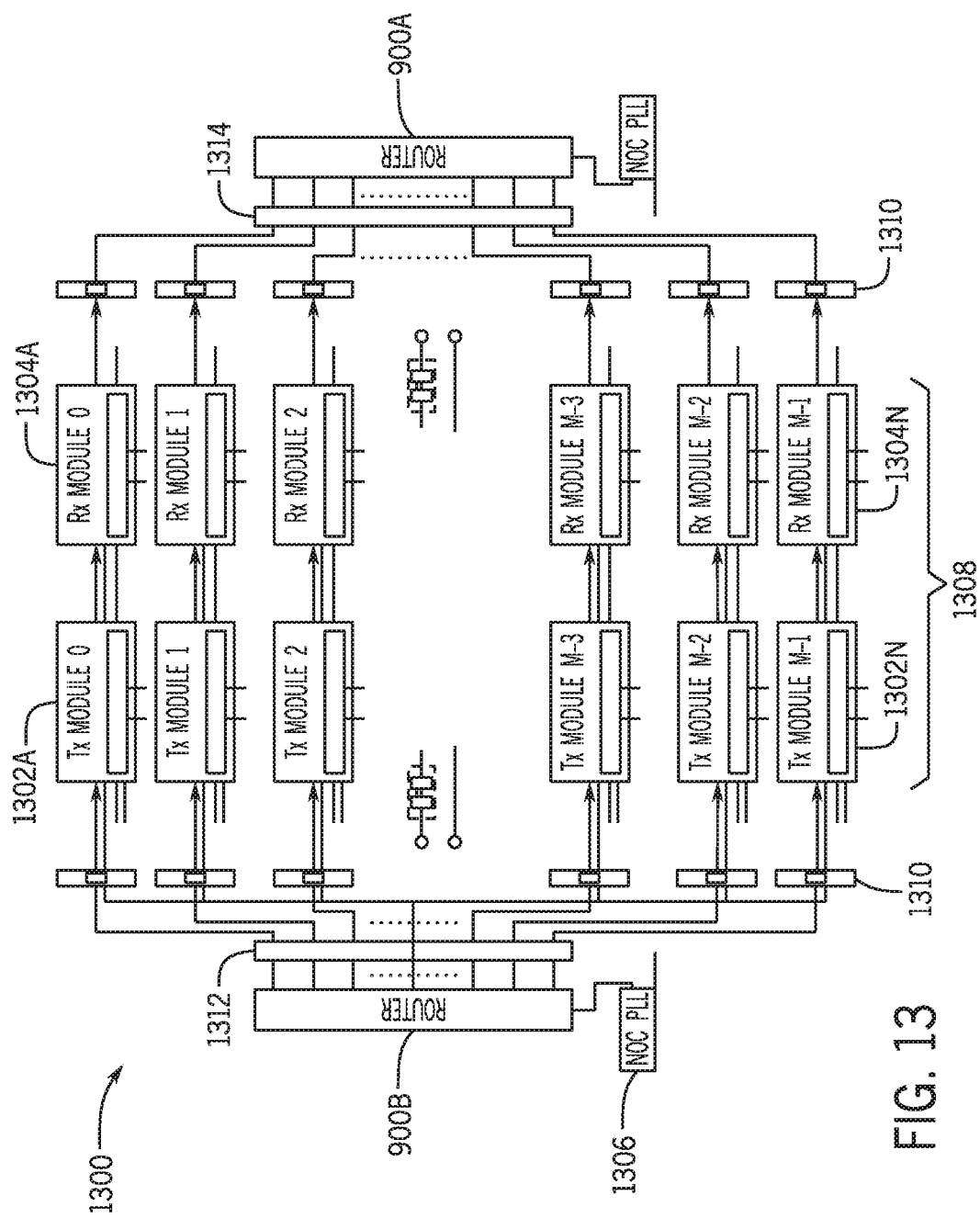
FIG. 13 is a block diagram of a NOC interface used to facilitate asynchronous data transfer between the routers of the NOC interface architecture of FIG. 9 when data transfer clocks are phase misaligned, in accordance with an embodiment of the present disclosure.

FIG. 13 illustrates an implementation of a NOC interface 1300 that may facilitate asynchronous data transfer between the routers 900 when data transfer clocks are phase misaligned, in a manner similar to that described by the timing diagram 1200, in accordance with an embodiment of the present disclosure. For example, during asynchronous data transfer, the NOC interface 1300 may process and transfer the data with the assumption that the router clock domain 1212 and the interface clock domain 1210 may not be phase-aligned.

To transfer data at a high-bandwidth rate in a scalable manner, specific process blocks may be grouped together in modules to ensure synchronized data transfer between the phase misaligned router clock domain 1212 and the interface clock domain 1210, as described below. Further, the modules may ease implementation during scaling of the interface IP. In particular, signals between the transmitting router 900B and the receiving router 900A may be grouped into transmitting modules (TX module) 1302A-N and receiving modules 1304A-N. As previously mentioned, the routers 900A, 900B may operate on a slower clock domain 1212, such as 1 GHz, as controlled by a phase-locked-loop (PLL) 1306, than the Tx/Rx interface 1308. The Tx/Rx interface 1308 on the other hand, may operate on a faster clock domain 1210, such as 2 GHz. The ratio between the clocks 1210, 1212 may be determined based on speed and power performance of the transistors used in the NOC interface 802. In some embodiments, the greater the ratio, the greater amount of serialized data may be sent in a given time period in accordance with the process described by the timing diagram 1200.

However, in some embodiments, a phase misalignment may occur between the router clock domain 1212 and the interface clock domain 1210, introducing a skew between data from the different transmitting 1302A-N and receiving module 1304A-N pairs. The skew may result in misalignment of data frames and prevent the receiving router 900A from decoding the data correctly. In some embodiments, to phase align the router clock domain 1212 and the interface clock domain 1210 for each of the transmitting 1302A-N and receiving module 1304A-N pairs, a clock tree may be built between all the transmitting modules 1302A-N. However, building an accurate and precise clock tree based on a fast frequency clock, such as the interface clock domain 1210, may be difficult.

Thus, to compensate for and/or reduce the skew and appropriately recover data, asynchronous clock-crossing logic may be supported between the router clock domain 1212 and the interface clock domain 1210. The asynchronous clock-crossing mechanism may be supported using data processing and alignment hardware, as will be discussed in further detail below. For example, a pipeline timing register 1310 may be placed between the router 900A and the Tx/Rx interface 1308, and/or between the router 900B and the Tx/Rx interface 1308, to ensure timing closure between the different transmitting 1302A-N and receiving module 1304A-N pairs.

Further, word markers (e.g., via the word marker block 1312) and word aligners (e.g., via a word marker aligner block 1314) may be used in the asynchronous clock-crossing logic to compensate for and/or reduce the skew. In particular, a packet of data being transmitted by the transmitting router 900B may be marked by the word marker block 1312 with an indicator, such as a 2-bit indicator (e.g., 2'b00, 2'b01, 2'b10, or 2'b11), to indicate that portions of data transmitted by the respective transmitting modules 1302 A-N are associated with each other. That is, the indicator may encode the sequence of the data transmitted by the transmitting modules 1302A-N. The receiving modules 1304A-N may include the word marker aligner block 1314 that use the indicators to realign the received data to correspond to the order in which the data was transmitted by the transmitting modules 1302A-N. Once aligned, the receiving modules 1304A-N may transmit the data to the receiving router 900A.

Figure 14:
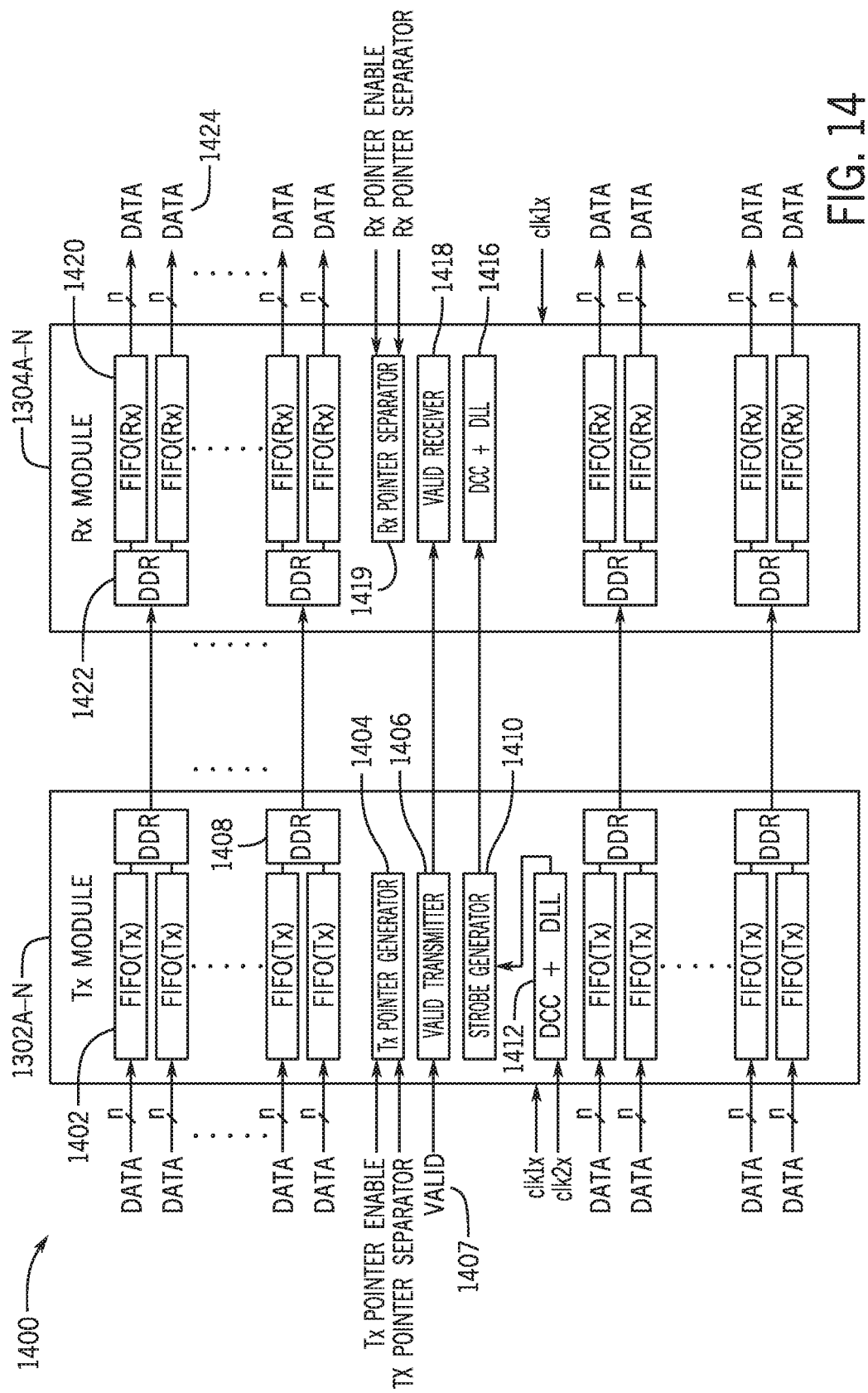
FIG. 14 is a block diagram further detailing the NOC interface used to facilitate asynchronous data transfer between the routers of the NOC interface architecture of FIG. 9 when data transfer clocks are not phase-aligned, in accordance with an embodiment of the present disclosure.

To further illustrate how the asynchronous clock-crossing logic may be supported by the NOC interface 802 when the phases of the router clock domain 1212 and the interface clock domain 1210 are misaligned, FIG. 14 depicts hardware 1400 included in the transmitting module 1302A-N and in the receiving module 1304A-N, in accordance with an embodiment of the present disclosure. The hardware of the transmitting module 1302A-N may include one or more first in first out (FIFO) buffers 1402 that receive the data from the transmitting router 900B. The FIFO buffers 1402 may enable safe and/or accurate clock-crossing from the router clock domain 1212 to the interface clock domain 1210 by isolating (e.g., storing data until an appropriate time) the domains.

The transmitting module 1302A-N may also include a TX pointer generator 1404, which may generate pointers that point to portions of the respective FIFO buffers 1402 that store data to be transmitted further downstream. In addition, the transmitting module 1302A-N may include a validity transmitter 1406. The validity transmitter 1406 may receive a valid signal 1407 generated by the transmitting router 900B. The valid signal 1407 may indicate whether data transmitted by the transmitting router 900B during a time period is valid data. For example, the router 900B may be idle for a period of time and may not transmit data. During such times, data picked up the transmitting module 1302A-N may be ignored and thus be indicated invalid by the valid signal 1407.

The transmitting module 1302A-N may additionally include a double data rate (DDR) output module 1408 and a strobe generator 1410. The strobe generator 1410 may be coupled to a duty cycle corrector (DCC) and delay-locked loop (DLL) processing blocks 1412. The DDR output module 1408 may set up the data to be transmitted via DDR in a specific sequence. For example, the DDR output module 1408 may transmit data at a rising edge and a falling edge of the interface clock domain 1210, where the data includes an indicator to determine the appropriate data sequence, as described above. Thus, the DDR output module 1408 may facilitate high bandwidth connectivity of the NOC interface 802.

The DCC processing block of the DCC and DLL processing blocks processing blocks 1412 may ensure that a clock duty cycle is high for 50% of a time period and low for the other 50%. By correcting the duty cycle as much as possible to avoid irregular or undesired duty cycles, the DCC processing block of the DCC and DLL processing blocks 1412 may ensure that data is appropriately transmitting on the rising edge and the falling edge of the interface clock domain 1210, in accordance with the DDR techniques. Further, the DLL processing block of the DCC and DLL processing blocks 1412 may facilitate handling of the relatively fast interface clock domain 1210 by shifting the clock to optimize and/or ensure accurate data sampling.

Signals from the DCC and DLL processing blocks 1412 may be transmitted to the strobe generator 1410. The strobe generator 1410 may be a strobe clock that enables correct sampling of data. For example, on the transmitting side, the strobe generator 1410 may introduce a delay during data transfer and on the receiving side, the strobe generator may sample the data in accordance with the same delay.

Indeed, the DCC and DLL processing blocks 1416 of the receiving module 1304A-N may receive a strobe signal from the strobe generator 1410 to facilitate appropriate sampling and reconstruction of transmitted data at the receiver end. To facilitate appropriate sampling, the DCC and DLL processing blocks 1416 may perform pre-sampling training and pre-sampling margining to optimize and/or ensure accurate interface timing to reduce the sampling error.

Further, a valid receiver 1418 of the receiving module 1304A-N may receive a validity signal from the validity transmitter 1406 to guide data loading and data unloading to and from receiving FIFO buffers 1420. For example, the valid receiver 1418 may be coupled to an RX pointer generator 1419 that points to portions of the receiving FIFO buffers 1420 that store the received data. This may further ensure that the received data is reassembled correctly.

Moreover, the receive module 1304A-N may also include a DDR input module 1422 that may receive the data from the transmitting module 1302A-N via a DDR technique. In other words, the DDR input module 1422 may receive the data at a rising edge and a falling edge of the interface clock domain 1210. Once received, the DDR input module 1422 may transmit the data to the receiving FIFO buffers 1420 based on indicators associated with the data. For example, when multiple recently stored portions of data have the same indicator, the portions of data may be word-aligned and then transmitted to the receiving router 900A via output ports 1424. When the recently stored portions of data have different indicators, then the portions of data may not be word-aligned and not transmitted to the receiving router 900A. In some embodiments, the NOC interface 1300 may transmit data in a different and/or opposite direction than described, such as from router 900A to router 900B.

Figure 15:
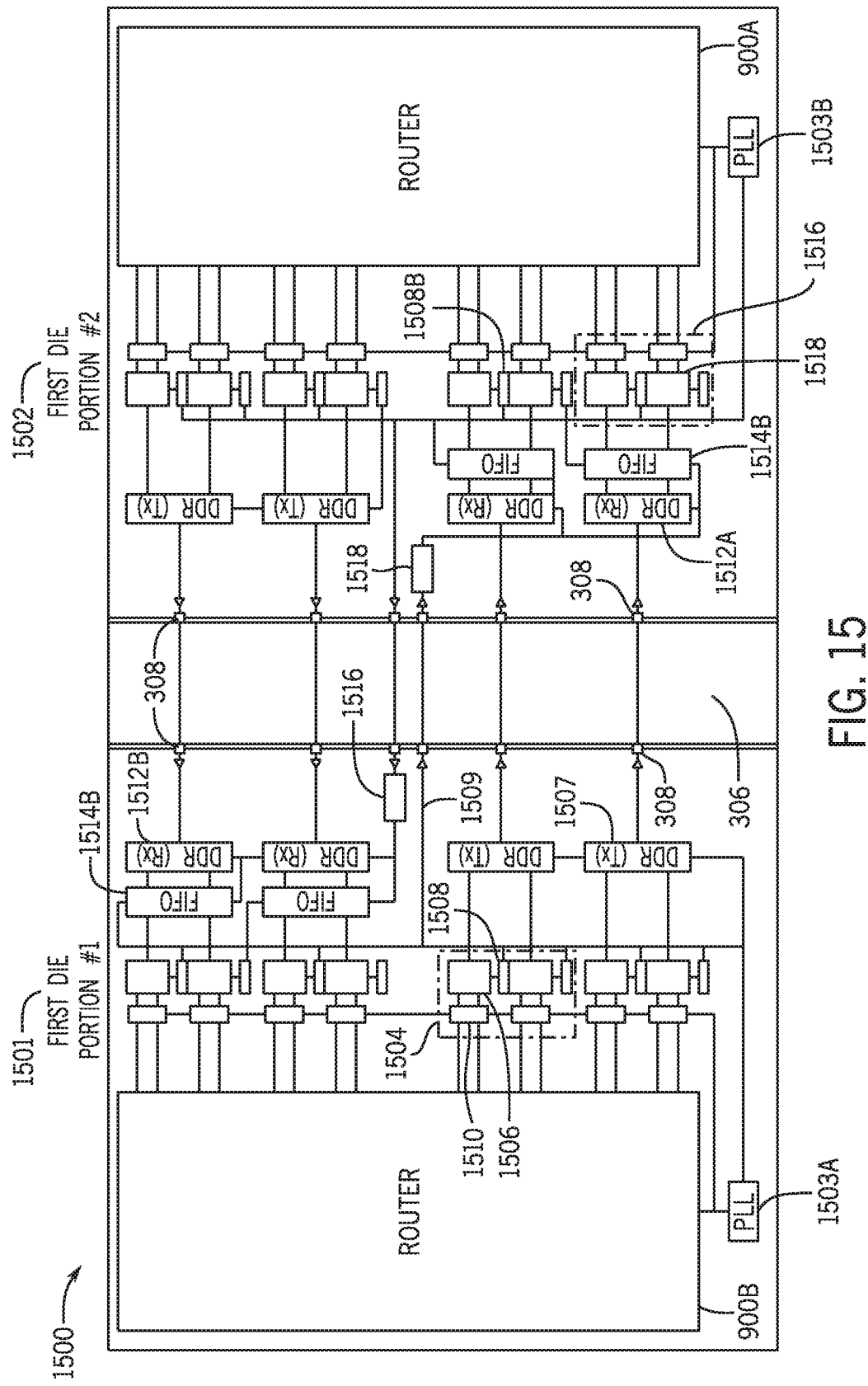
FIG. 15 is a block diagram of a NOC interface used to facilitate asynchronous data transfer between the routers of the NOC interface architecture of FIG. 9 when data transfer clocks are phase aligned, in accordance with an embodiment of the present disclosure.

FIG. 15 illustrates an implementation of a modularized integrated circuit device 1500 that may facilitate asynchronous data transfer between the routers 900, in a manner similar to that described by the timing diagram 1200, when the data transfer clocks are phase aligned, in accordance with an embodiment of the present disclosure. That is, the modularized integrated circuit device 1500 may process and transfer data between portions of a die (e.g., a glue die 302 or a peripheral IP die 304) when the router clock domain 1212 and interface clock domain 1210 of the die 302, 304 are phase-aligned due to the clocks being generated by the same die processing block. To transfer data at a high-bandwidth rate in a scalable manner, specific process blocks may be grouped together in modules to ensure synchronized data transfer between the phase aligned router clock domain 1212 and the interface clock domain 1210, as described below. Further, the modules may ease implementation during scaling of the interface IP.

The die of the modularized integrated circuit device 1500 may include a transmitting portion (e.g., first die portion #1) 1501 and a receiving portion (e.g., first die portion #2) 1502. The transmitting portion 1501 may include the transmitting router 900B that may operate according to a router clock domain 1212, whose frequency is set by a die-wide phase-locked loop (PLL) (e.g., 1503A). The die-wide PLL may also set the interface clock domain 1210 to a higher frequency, such as twice the frequency of the router clock domain 1212. In some embodiments, when the same PLL is used to generate clock domains 1210, 1212 for different portions 1502, 1502 on the same die 302, 304, the clock domains 1210, 1212 may be phase aligned.

The transmitting router 900B may transmit the data to one or more TDM structures 1504, each of which may include two TDM multiplexers 1506, one or more TDM counters 1508, and one or more flip flops 1510. In some embodiments, the multiplexer 1506 may be a 2:1 multiplexer, as shown here, a 4:1 multiplexer, an 8:1 multiplexer, a 4:3 multiplexer, 4:2 multiplexer, or the like. In other words, the multiplexer 1506 may be of any TDM ratio that facilitates conversion of data multiple bits wide to data that is fewer bits wide.

The TDM structure 1504 may serialize the data received. For example, when a 2:1 multiplexer is used, the multiplexer 1506 may combine two bits of data into a single bit. The serialized output of the TDM structure 1504 may be transmitted to a DDR output (e.g., transmitting) module 1507 using the routing clock interface 1212. Because of the phase alignment between the router clock domain 1212 and the interface clock domain 1210, the transmitting router 900B may transmit the data directly to the DDR output module 1507 without using a clock-isolation buffer, such as a first-in-first-out (FIFO) buffer. The DDR output module 1507 may transmit data downstream on both a rising edge and falling edge of the interface clock domain 1210. Using TDM, DDR, and the interface clock domain 1210 operating at the higher frequency may enable faster data transmission to another portion of the die, such as the receiving portion 1502, for example, up to four times faster per transmission period 1203.

During downstream data transmission, each DDR output module 1507 may output the serialized data to a microbump 308 of the transmitting portion 1501. That is, a single microbump 308 may be used to transmit data at the rising edge and the falling edge of the interface clock domain 1210. The data may be transmitted to a microbump 308 of the receiving portion 1502 via the passive silicon interposer 306. Further, a signal 1509 of the interface clock domain 1210 may be transmitted from the transmitting portion 1501 to the receiving portion 1502 via the microbumps 308 and the passive silicon interposer 306 to enable correct data sampling at the receiving portion 1502.

In particular, the signal 1509 may be received by a DLL and DCC processing block 1518 of the receiving portion 1502. The DLL and DCC processing block 1518 may delay (e.g., phase-shift) the interface clock domain 1210 before the signal 1509 reaches a DDR input (e.g., receiving) module 1512A. The signal 1509 may be used to drive the DDR input module 1512A and the delay introduced by the DLL and DCC processing block 1518 may facilitate reducing duty cycle distortion before data is received by a receiving router 900A of the receiving portion 1502.

Using the shifted interface clock domain 1210, the DDR input module 1520 may appropriately sample the data transmitted across the passive silicon interposer 306 using DDR. In other words, the DDR input module 1512A may convert the data to a single data rate (SDR) by demultiplexing the data at the rising edge and falling edge of the shifted interface clock domain 1210. Further, the DDR input module 1512A may receive a signal from a receiving portion PLL 1503B that controls sampling of data received at the DDR input module 1512A.

Because the sampling signal from the receiving portion PLL 1503B and the signal 1509 may not be phase-aligned as each signal is generated by a different PLL (e.g., 1503B, 1503A, respectively), the clock domains may no longer be phase aligned. As such, an asynchronous FIFO buffer 1514A may be coupled to each DDR input module 1512A and may store the sampled data. The FIFO buffer 1514A may provide clock domain isolation between the interface clock domain 1210 and the router clock domain 1212 of the receiving portion 1502, which, as just mentioned, runs at a slower frequency than the interface clock domain 1210 and may be phase misaligned with one another. As such, the FIFO buffer 1514A may act as a clock-crossing buffer.

The data stored in the receiving FIFO buffer 1514A may be read out at the rate of the routing clock domain 1212 (e.g., half the frequency of the interface clock domain 1210) to a receiving TDM structure 1516. The receiving TDM structure 1524 may include a demultiplexer 1518, such as a 1:2 demultiplexer, that may operate in a manner opposite of the TDM multiplexer 1506. In this example, the 1:2 demultiplexer 1518 may demultiplex the serialized 2 bits of data and synchronize the data to the receiver router clock domain 1212 so that the data may be appropriately transferred to the receiving router 900A. In some embodiments, the modularized integrated circuit device 1500 may transmit data in an opposite direction than described, such as from router 900A to router 900B.

In some embodiments, the hardware architecture of the modularized integrated circuit 1500 may work in the opposite direction. For example, the router 900A of the receiving portion 1502 may transmit data to transmitting hardware of the receiving portion 1502, which may include similar architecture as the transmitting hardware of the transmitting portion 1501. Further, the transmitting portion 1501 may receive the data using receiving hardware that is similar to the receiving hardware of the receiving portion 1502.

Figure 16:
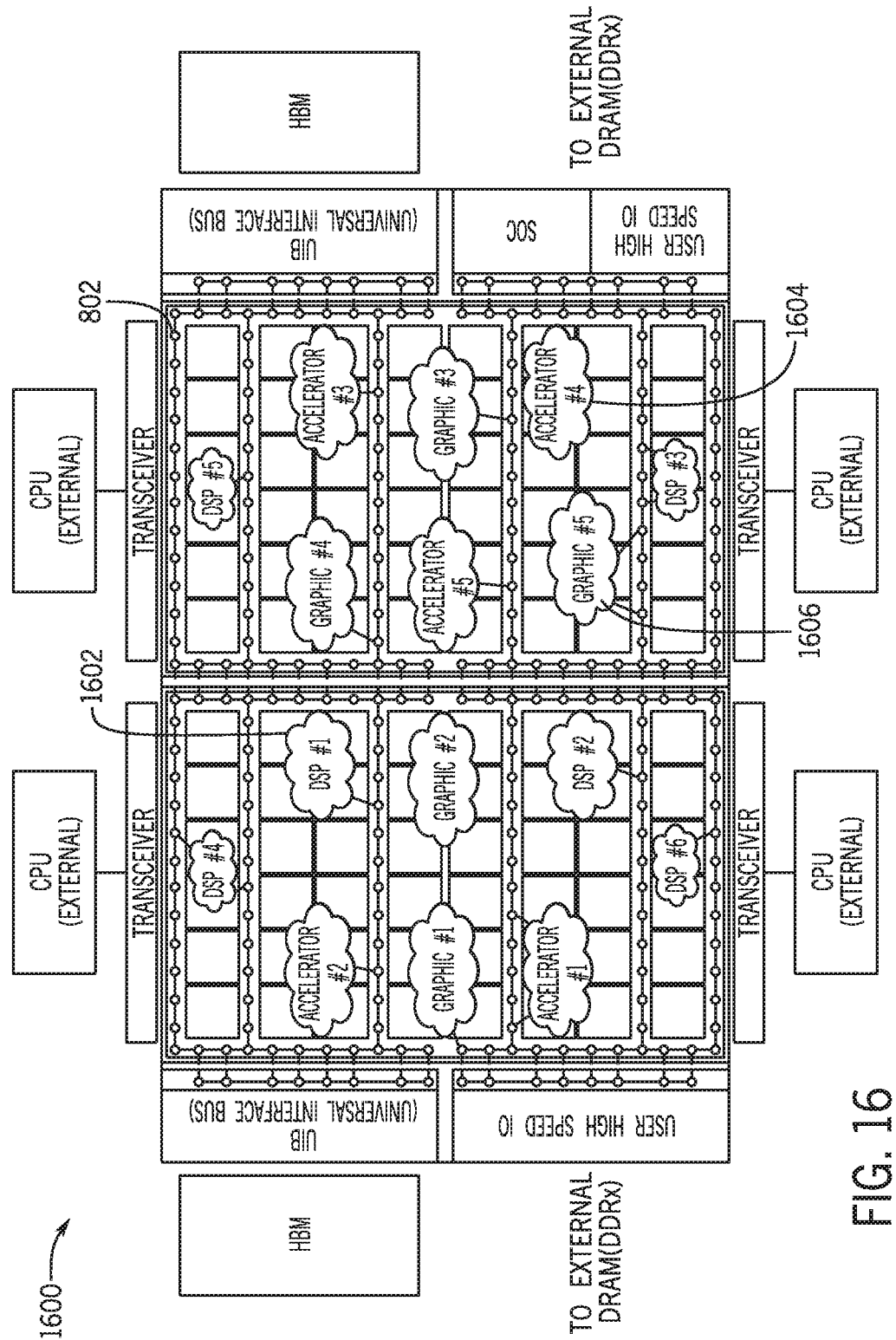
FIG. 16 is a schematic of an application implemented using the NOC interface of FIG. 9 to meet application performance demands, in accordance with an embodiment of the present disclosure.

Whether the NOC interface 802 facilitates synchronous and/or asynchronous data transfer, the NOC interface 802 may facilitate meeting bandwidth and latency performance demands of an implemented application, as shown in FIG. 16 in accordance with an embodiment of the present disclosure. As an illustrative example, a graphics application may be implemented on the modularized integrated circuit device 1500. To implement the graphics application, digital signal processing (DSP) units 1602, accelerator units 1604, graphics processors 1606, and other components may be programmed onto the programmable fabric of the glue dies 302.

The programmed application components may traditionally be concentrated at the edge of the programmable fabric and near periphery IP to reduce communication latency and routing congestion arising from data transfer via traditional connections (e.g., HIOs/VIOs) in the programmable fabric. With integration of the NOC interface 802 in the modularized integrated circuit device 800, communication latency and routing congestion may be reduced. In particular, since the NOC interface 802 is spread throughout the FPGA SoC, including in between dies 302, 304, high bandwidth and low latency connectivity may be available throughout the programmable fabric. Enabling reduced communication latency and routing congestion may enable programming of the application components deeper in the glue die 302 (e.g., away from a shoreline, edge, or periphery of the glue die 302) and thus, may reduce clustering of the application components. In other words, hot spots (e.g., power consuming sections of the modularized integrated circuit device 800) may be spread throughout the programmable fabric rather than concentrated at the shoreline of the programmable fabric.

In some embodiments, the application components may each access memory IP (e.g., HBM and/or DRAM) for data storage and loading during run-time. Traditionally, each application component may have access to a single channel of the memory IP. However, routing circuitry (e.g., die-to-die direct interconnections 502) capable of accessing the single channel may be limited to a small portion of the programmable fabric, further concentrating memory bandwidth demanding application components. The NOC interface 802 however, may spread memory bandwidth demand throughout the FPGA SoC. For example, by enabling the application components to be programmed throughout the programmable fabric of the glue die 302, the memory bandwidth may be requested from portions of the programmable fabric that are not at the shoreline.

Further, because of the clock domain-crossing (CDC) functionality of the NOC interface 802, the routers 900 of the peripheral IP die 304 may be organized to form a crossbar switch that may facilitate crossing signals from the glue die clock domain to the periphery IP clock domain. With this switching mechanism, the NOC interface 802 may enable switching between inputs and outputs, such that multiple channels of a memory IP may be accessed by the user logic. Thus, the NOC interface 802 may enable access of the memory IP by the user logic regardless of where the user logic is located in the glue die 302. Further, the NOC interface 802 may enable the application components to operate at a different frequency than periphery IP dies 304.

The present systems and techniques relate to embodiments for meeting high-bandwidth and low-latency connectivity demands using a scalable, modular communication interface that does not consume excessive amounts of power, silicon area, and/or microbumps. The present embodiments may facilitate interfacing of dies 302, 304 running at different frequencies, data widths, bandwidth requirements, and the like. The present embodiments may also enable multiple cores to exploit parallelism and concurrency of independent memory channels provided by the HBM and external DDR IP memories. Further, the present embodiments may maintain effective crossbar capability for HBM access and may add crossbar capability to a user IO tile to form EMIF (external memory interface) to support external DRAM (DDRx). Moreover, the present embodiments may facilitate modularization and scalability of the integrated circuit device 102.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An integrated circuit system, comprising:
a first die comprising one or more programmable fabric circuitry sectors;
a second die comprising modular periphery intellectual property (IP);
an interposer coupling the first die to the second die; and
a modular interface disposed in the interposer comprising a network-on-chip (NOC) having a plurality of routers, wherein the modular interface is configurable to:

provide communication between the first die and the second die via a first portion of the modular interface located between the first die and the second die;
provide communication between the one or more programmable fabric circuitry sectors via a second portion of the modular interface located between the one or more programmable fabric circuitry sectors; and
provide communication between the first die and a third die comprising additional one or more programmable fabric circuitry sectors via a third portion of the modular interface comprising a crossbar switch formed by one or more routers of the plurality of routers located between the first die and the third die.

2. The integrated circuit system of claim 1, wherein the modular interface is configurable to provide a high-bandwidth, low-latency communication comprising transmitting and receiving signals at 0.25-0.5 terabytes per second per direction per link and at a speed double that of an operating frequency of the one or more programmable fabric circuitry sectors.

3. The integrated circuit system of claim 1, wherein the modular periphery IP comprises a double data rate (DDR) tile, a low power DDR (LPDDR) tile, a high bandwidth memory (HBM) tile, embedded static random-access memory (eSRAM) tile, a Universal Interface Bus (UIB) tile, an input/output (I/O) tile, or any combination thereof, and wherein the modular periphery IP is configurable to perform a function associated with the programmable fabric circuitry sectors.

4. The integrated circuit system of claim 1, wherein the plurality of routers is configurable to route data to portions of the first die or portions of the second die, wherein a router of the plurality of routers comprises:
a first port configurable to receive data from an adjacent router of the plurality of routers, transmit the data to another adjacent router of the plurality of routers, or a combination thereof;
a second port configurable to:
receive the data, via an associated router bridge, from:
a sector of the one or more programmable fabric circuitry sectors;
the modular IP; or
a combination thereof; and
transmit the data, via the associated router bridge, to:
another sector of the one or more programmable fabric circuitry sectors;
a fourth die comprising another modular IP; or
a combination thereof; and
crossbar circuitry configurable to route the data to the first port or the second port based on a destination of the data.

5. The integrated circuit system of claim 4, wherein the associated router bridge comprises:
a clock-crossing buffer configurable to convert a protocol of data from a user logic data protocol to a router data protocol to facilitate appropriate data transmission by the NOC;
a data width converter configurable to convert a width of the data from a user logic compatible data width to a router compatible data width; and
a switch configurable to select a portion of the data held in a virtual channel for processing by the router.

6. The integrated circuit system of claim 1, wherein second die comprises a fabric network-on-chip (FNOC) configurable to bridge the second die to the NOC.

7. The integrated circuit system of claim 1, wherein the plurality of routers is configurable to route data to portions of the first die or portions of the second die, wherein a router of the plurality of routers comprises a virtual channel configurable to aggregate the data for downstream transmission based at least in part on a priority of the data.

8. The integrated circuit system of claim 1, wherein the plurality of routers is configurable to route data to portions of the first die or portions of the second die, wherein a router of the plurality of routers comprises a clock-crossing buffer configurable to convert a protocol of the data from a router data protocol to a user logic data protocol.

9. A modularized integrated circuit comprising a plurality of dies and a network-on-chip (NOC) interface, wherein the NOC interface comprises:
a first router of a first die of the plurality of dies, wherein the first router is configurable to transmit data;
a second router of a second die of the plurality of dies, wherein the second router is configurable to receive the data transmitted by the first router;
one or more transmission modules coupled to the first router, wherein the one or more transmission modules are configurable to:
receive a respective portion of the data from the first router; and
transmit the respective portion of the data using a double data rate (DDR) technique with an interface clock operating at a faster frequency than a router clock that controls operations of the first router; and
one or more receiving modules coupled to the one or more transmission modules and to the second router, wherein the one or more receiving modules are configurable to:
receive the respective portion of the data from a transmission module of the one or more transmission modules associated with a respective receiving module of the one or more receiving modules;
demultiplex the respective portion of the data from a double data rate (DDR) to a single data rate (SDR); and
in response to demultiplexing the respective portion of the data, transmitting the respective portion of the data to the second router.

10. The modularized integrated circuit of claim 9, wherein the first router is configurable to receive the data from the second router, and wherein the second router is configurable to transmit the data from the first router.

11. The modularized integrated circuit of claim 9, comprising a word marker block coupled to the first router and the one or more transmission modules, wherein the word marker block is configurable to provide an indicator to respective portions of the data, wherein the indicator indicates a sequence in which the data is transmitted to the one or more receiving modules.

12. The modularized integrated circuit of claim 9, comprising a word align block coupled to the second router and the one or more receiving modules, wherein the word align block is configurable to align respective portions of the data received from the second router.

13. The modularized integrated circuit of claim 12, wherein the word align block is configurable to transmit respective portions of the data downstream in response to the data being aligned.

14. The modularized integrated circuit of claim 9, wherein the one or more transmission modules comprise a validity transmitter configurable to transmit a validity signal to the one or more receiving modules in response to the transmitted data being valid.

15. The modularized integrated circuit of claim 9, wherein demultiplexing the respective portion of the data from the double data rate (DDR) to the single data rate (SDR) comprises sampling the data at a rising edge of the interface clock and at a falling edge of the interface clock.

16. The modularized integrated circuit of claim 9, wherein the interface clock operates at twice a faster frequency than the router clock.

17. The modularized integrated circuit of claim 9, wherein the one or more transmission modules comprise a strobe generator that is configurable to:
   generate a strobe clock based at least in part on the interface clock; and
   transmit the strobe clock to the one or more receiving modules, wherein the one or more receiving modules are configurable to sample respective portions of the data according to a delay of the strobe clock.

18. An integrated circuit, comprising:
   a first die comprising:
      a first microbump;
      a first router configurable to transmit data using a router clock; and
      a first interface coupled to the first microbump and the first router, wherein the first interface comprises:
         a first time-division multiplexing (TDM) structure configurable to serialize data received by the first router; and
         a first double date rate (DDR) module configurable to transmit the serialized data to the first microbump via a DDR technique using an interface clock operating at a faster frequency than the router clock; and
   a second die comprising:
      a second microbump coupled to the first microbump via a passive silicon interposer;
      a second router configurable to receive data transmitted by the first router using the router clock; and
      a second interface coupled to second microbump and the second router, wherein the second interface comprises:
         a second double date rate (DDR) module configurable to receive the serialized data from the second microbump via the DDR technique using the interface clock; and
         a second time-division multiplexing (TDM) structure configurable to:
            demultiplex the serialized data; and
            transmit the demultiplexed data to the second router using the router clock.

19. The integrated circuit of claim 18, wherein the first router is configurable to receive data, the first time-division multiplexing (TDM) structure is configurable to demultiplex the data received by the first router, the second router is configurable to transmit data to the first router, and the second time-division multiplexing (TDM) structure is configurable to serialize the data.

20. The integrated circuit of claim 18, wherein the DDR technique comprises transmitting or sending the data at a rising edge of the interface clock and at a falling edge of the interface clock.

* * * * *